US010026233B2

(12) United States Patent
Li

(10) Patent No.: US 10,026,233 B2
(45) Date of Patent: *Jul. 17, 2018

(54) EFFICIENT ORIENTATION ESTIMATION SYSTEM USING MAGNETIC, ANGULAR RATE, AND GRAVITY SENSORS

(71) Applicant: Ariadne's Thread (USA), Inc., Solana Beach, CA (US)

(72) Inventor: Adam Li, Solana Beach, CA (US)

(73) Assignee: Ariadne's Thread (USA), Inc., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,601

(22) Filed: Mar. 7, 2017

(65) Prior Publication Data
US 2017/0185171 A1   Jun. 29, 2017

Related U.S. Application Data

(63) Continuation of application No. 14/864,327, filed on Sep. 24, 2015, now Pat. No. 9,588,598, which is a
(Continued)

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC ........ G06F 3/0346; G06F 3/011; G06F 3/016; G02B 27/017; G02B 27/0172
See application file for complete search history.

(56) References Cited

U.S. PATENT DOCUMENTS 5,841,439 A   11/1998   Pose et al.
6,445,815 B1   9/2002   Sato
(Continued)

OTHER PUBLICATIONS

International Search Report and Written Opinion of International Application No. PCT/US16/38564, dated Aug. 5, 2016, 9 pages.
(Continued)

*Primary Examiner* — Ricardo L Osorio
(74) *Attorney, Agent, or Firm* — ARC IP Law, PC; Joseph J. Mayo

(57) ABSTRACT

A system that efficiently estimates an object's orientation using magnetic, angular rate, and gravity sensors. The object may be for example a virtual reality headset or a user in a virtual reality environment. Magnetic and gravity data are used to correct errors that accumulate from integrating angular velocity. Unlike systems that use Kalman filter approaches, embodiments of the system apply a simple, highly efficient technique to generate magnetic and gravity error vectors; these error vectors are added directly to the angular velocity prior to integration. Error calculations are performed in the sensor reference frame rather than in the Earth reference frame. Magnetic error correction uses only the horizontal component of the magnetic field, which is efficiently calculated by subtracting off the projection of the magnetic field onto the measured gravity vector. Sensors and processors for calculating orientation may be integrated into a low-latency virtual reality display system.

12 Claims, 22 Drawing Sheets

Related U.S. Application Data continuation-in-part of application No. 14/788,633, filed on Jun. 30, 2015, now Pat. No. 9,240,069.

(51) Int. Cl.
  *G02B 27/01* (2006.01)
  *G06F 3/0481* (2013.01)
  *G06F 3/0482* (2013.01)
  *G06F 3/0484* (2013.01)

(52) U.S. Cl.
  CPC .............. *G06F 3/012* (2013.01); *G06F 3/013* (2013.01); *G06F 3/014* (2013.01); *G06F 3/017* (2013.01); *G06F 3/0481* (2013.01); *G06F 3/0482* (2013.01); *G06F 3/04842* (2013.01); *G06F 3/04845* (2013.01); *G02B 2027/0178* (2013.01)

(56) References Cited

U.S. PATENT DOCUMENTS

| | | | |
|---|---|---|---|
| 7,469,166 | B2 | 12/2008 | Dariush |
| 7,860,676 | B2 * | 12/2010 | Sheng ................... H04N 5/4403 702/104 |
| 8,113,991 | B2 | 2/2012 | Kutliroff |
| 8,629,836 | B2 * | 1/2014 | Liberty ................. G06F 3/0346 345/156 |
| 8,866,742 | B2 * | 10/2014 | Banning ................ G03B 21/00 345/158 |
| 9,063,330 | B2 | 6/2015 | LaValle et al. |
| 9,164,588 | B1 * | 10/2015 | Johnson .................. G06F 3/017 |
| 9,229,540 | B2 * | 1/2016 | Mandella ................ G06F 3/011 |
| 9,240,069 | B1 | 1/2016 | Li |
| 9,459,276 | B2 * | 10/2016 | Joseph .................... G01P 21/00 |
| 2007/0183649 | A1 | 8/2007 | Kiefer et al. |
| 2008/0143729 | A1 | 6/2008 | Wyatt et al. |
| 2010/0111370 | A1 | 5/2010 | Black et al. |
| 2010/0232727 | A1 | 9/2010 | Engedal |
| 2011/0018811 | A1 | 1/2011 | Miernik |
| 2011/0018903 | A1 | 1/2011 | Lapstun et al. |
| 2011/0157028 | A1 | 6/2011 | Stallings et al. |
| 2011/0302293 | A1 | 12/2011 | Buban |
| 2012/0188179 | A1 | 7/2012 | Karlsson |
| 2012/0235902 | A1 | 9/2012 | Eisenhardt et al. |
| 2012/0256840 | A1 | 10/2012 | Razzaghi |
| 2013/0018679 | A1 | 1/2013 | Qian |
| 2013/0235696 | A1 | 9/2013 | Larsen et al. |
| 2013/0238295 | A1 | 9/2013 | Hyung et al. |
| 2013/0241947 | A1 | 9/2013 | Hirota et al. |
| 2014/0049983 | A1 | 2/2014 | Nichol et al. |
| 2014/0125471 | A1 | 5/2014 | Organ et al. |
| 2014/0146394 | A1 | 5/2014 | Tout et al. |
| 2014/0201690 | A1 | 7/2014 | Holz |
| 2015/0029218 | A1 | 1/2015 | Williams et al. |
| 2015/0049004 | A1 | 2/2015 | Deering et al. |
| 2015/0097858 | A1 | 4/2015 | Miki et al. |
| 2015/0153575 | A1 | 6/2015 | Komatsu et al. |
| 2015/0219899 | A1 | 8/2015 | Mack et al. |
| 2015/0287230 | A1 | 10/2015 | Cerny |
| 2015/0302653 | A1 | 10/2015 | Algreatly |
| 2015/0323988 | A1 | 11/2015 | Kuehne |
| 2016/0025971 | A1 | 1/2016 | Crow et al. |
| 2016/0070439 | A1 | 3/2016 | Bostick et al. |
| 2016/0085310 | A1 | 3/2016 | Shotton et al. |
| 2016/0210780 | A1 | 7/2016 | Paulovich et al. |
| 2017/0018121 | A1 | 1/2017 | Lawson et al. |

OTHER PUBLICATIONS d3, Realtime 3D Simulation, posted on https://d3technologies.com/features/3d_simulation, dated Dec. 10, 2013, 3 pages.
Euston, et al., "A Complementary Filter for Attitude Estimation of a Fixed-Wing UAV", 2008, 6 pages.
Baldwin, et al., "Complementary filter design on the Special Euclidean Group SE(3)", 2007, 8 pages.
Madgwick, Sebastian, "An efficient orientation filter for inertial and inertial/magnetic sensor arrays", Apr. 30, 2010, 32 pages.
Marins, et al., "An Extended Kalman Filter for Quaternion-Based Orientation Estimation Using MARG Sensors", Proceedings of the 2001 IEEE/RSJ International Conference on Intelligent Robots and Systems; Maui, Hawaii; 2001, 9 pages.
Mahony, et al., "A coupled estimation and control analysis for attitude stabilisation of mini aerial vehicles", Nov. 20, 2006, 10 pages.
Mahony, et al., "Nonlinear Complementary Filters on the Special Orthogonal Group", IEEE Transactions on Automatic Control, vol. 53, No. 5, Jun. 2008, 16 pages.
Benton, Alex, "Oculus Rift in Action", Aug. 9, 2013, Obtained from http://rifty-business.blogspot.com/2013/08/understanding-oculus-rift-distortion.html.
Benton, Alex, "Oculus Rift in Action", Aug. 18, 2014, Obtained from http://rifty-business.blogspot.com/2014/08/using-timewarp-on-oculus-rift.html.
International Search Report received in PCT/US2017/026363, dated Jul. 10, 2017, 9 pages.
International Search Report received in PCT/US2017/053929, dated Jan. 4, 2017, 10 pages.
LaValle, Steve, "The Latent Power of Prediction", blog post retrieved from www.developer.oculus.com/blog/the-latent-power-of-prediction/, dated Jul. 12, 2013.

* cited by examiner

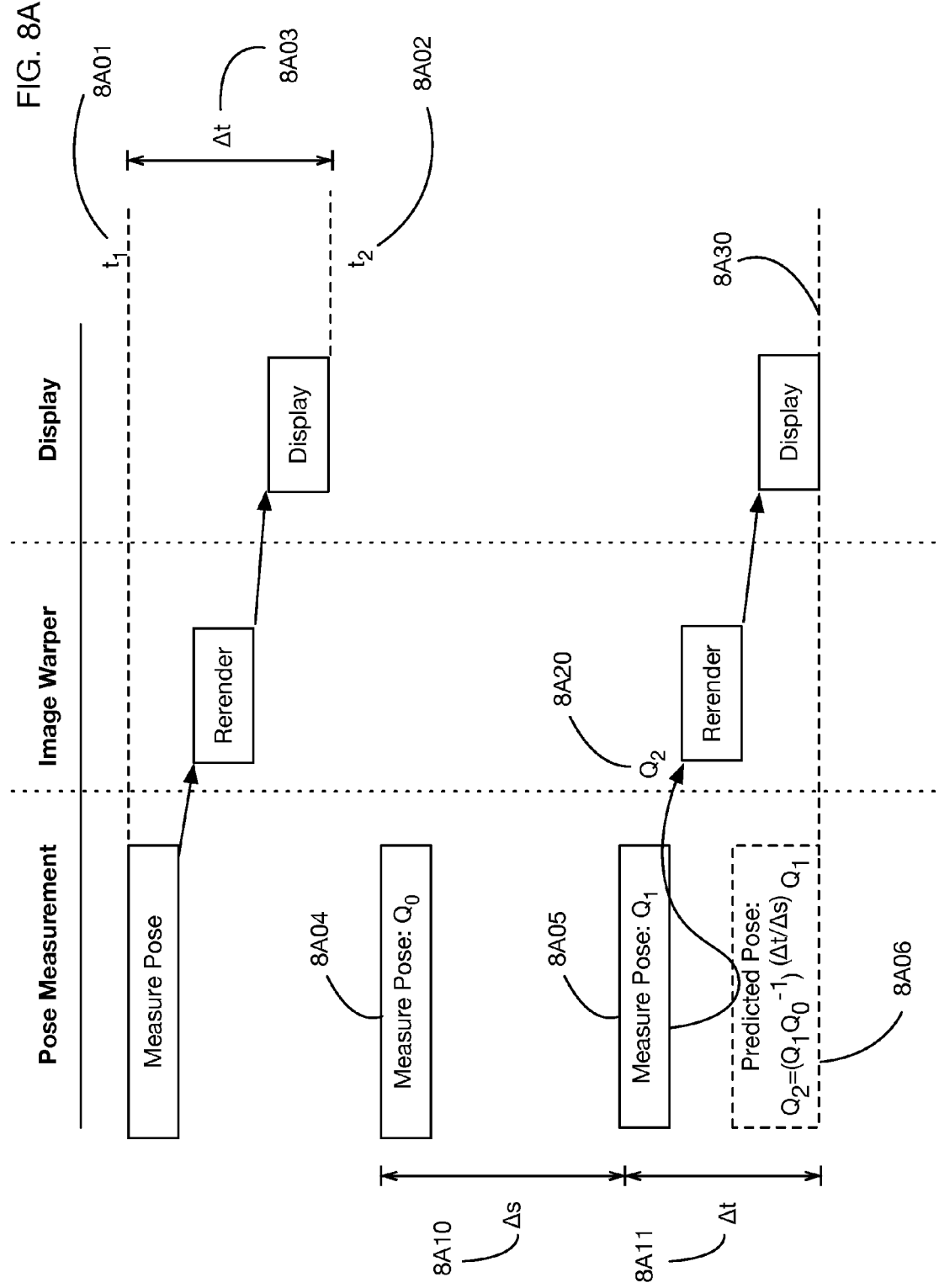

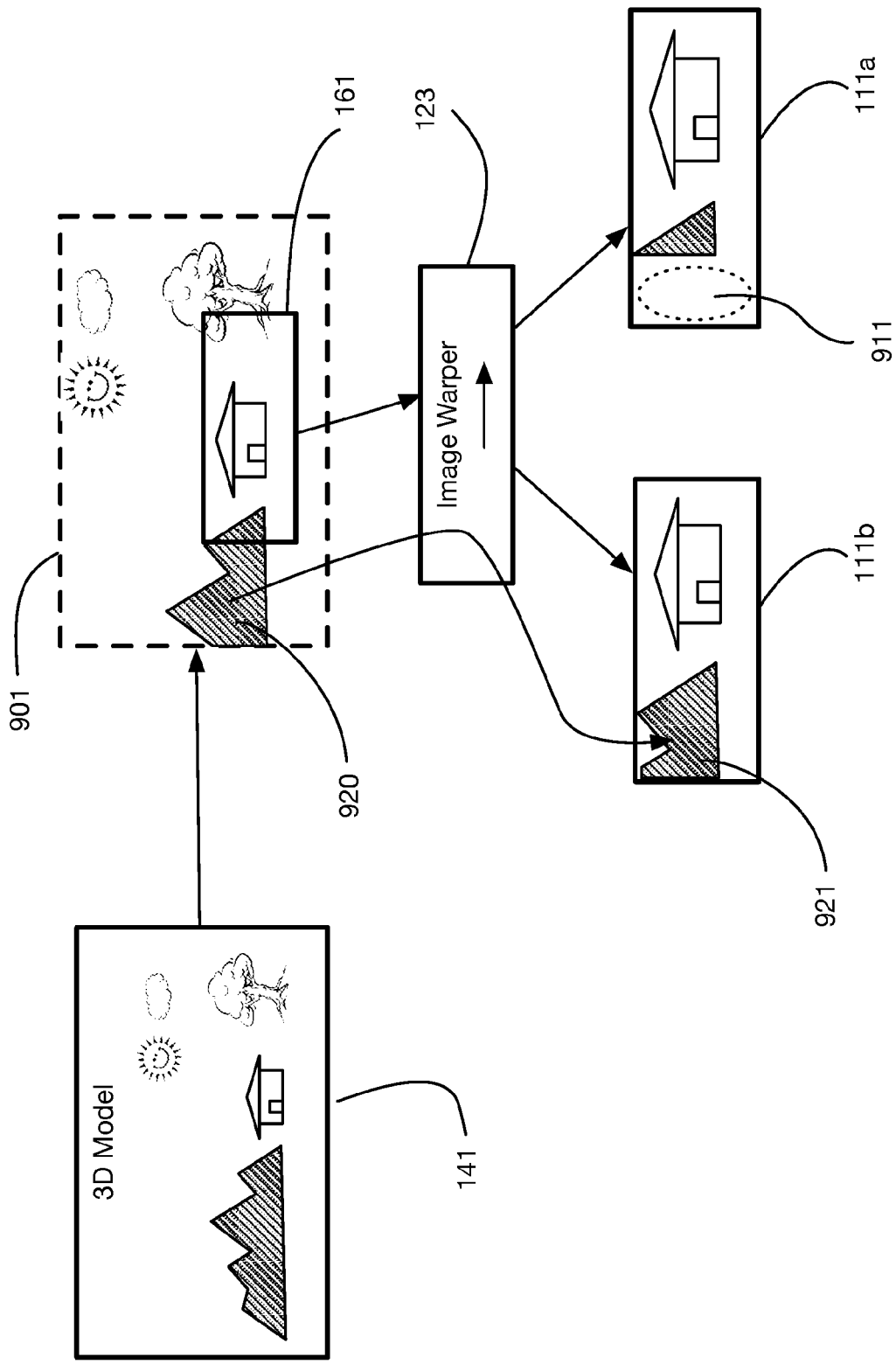

EFFICIENT ORIENTATION ESTIMATION SYSTEM USING MAGNETIC, ANGULAR RATE, AND GRAVITY SENSORS

This application is a continuation of U.S. Utility patent application Ser. No. 14/864,327, issued as U.S. Pat. No. 9,588,598, filed on 24 Sep. 2015, which is a continuation in part of U.S. Utility patent application Ser. No. 14/788,633, issued as U.S. Pat. No. 9,240,069, filed on 30 Jun. 2015, the specifications of which are hereby incorporated herein by reference.

BACKGROUND OF THE INVENTION

Field of the Invention

One or more embodiments of the invention are related to the field of virtual reality systems. More particularly, but not by way of limitation, one or more embodiments of the invention enable a system that efficiently estimates the orientation of an object using data from magnetic, angular rate, and gravity sensors. The system may be for example integrated into a virtual reality display system that tracks movements of a user and quickly renders a virtual reality display based on those movements.

Description of the Related Art

Virtual reality systems are known in the art. Such systems generate a virtual world for a user that responds to the user's movements. Examples include various types of virtual reality headsets and goggles worn by a user, as well as specialized rooms with multiple displays. Virtual reality systems typically include sensors that track a user's head, eyes, or other body parts, and that modify the virtual world according to the user's movements. The virtual world consists of a three-dimensional model, computer-generated or captured from real-world scenes. Images of the three-dimensional model are generated based on the user's position and orientation. Generation of these images requires rendering of the three-dimensional model onto one or more two-dimensional displays. Rendering techniques are known in the art and are often used for example in 3D graphics systems or computer-based games, as well as in virtual reality systems.

A major challenge for existing virtual reality systems is combining realistic images with low-latency rendering, so that user's virtual reality experience matches the rapid feedback to movement observed in real environments. Existing systems often have long latency to measure changes in the user's position and orientation, and to rerender the virtual world based on these changes. 3D rendering is a complex and processor intensive operation that can take potentially hundreds of milliseconds. The result is that users perceive noticeable lag between their movements and the rendering of updated virtual environments on their displays. Three technology trends are compounding this challenge: (1) The complexity of 3D models is growing as more 3D data is captured and generated. (2) Resolution of virtual reality displays is increasing, requiring more computational power to render images. (3) Users are relying increasingly on mobile devices with limited processor capacity. As a result of these trends, high latency in rendering virtual reality displays has become a major factor limiting adoption and applications of virtual reality technology. There are no known systems that provide sufficiently low-latency rendering and display to generate highly responsive virtual reality environments given these technology constraints.

Virtual reality systems require an estimate of the user's orientation in order to generate a virtual reality display that changes as the user moves. Inefficient or complex procedures to estimate the user's orientation can also contribute to significant latency. Existing systems for orientation estimation generally use complex algorithms for sensor fusion, for example to combine measurements of magnetic field, angular rate, and gravity into an orientation estimate. One approach to sensor fusion known in the art is Kalman filtering. As discussed below in the Detailed Description section, Kalman filtering is generally complex and inefficient when applied to orientation estimation. Another approach described below in the Detailed Description section uses gradient descent to combine sensor data into an orientation estimate. While this gradient descent approach avoids some of the issues with Kalman filtering, it also requires relatively complex and potentially inefficient calculations. Existing systems for orientation estimation may not be efficient enough to support very low-latency virtual reality displays.

For at least the limitations described above there is a need for an efficient orientation estimation system using magnetic, angular rate, and gravity sensors.

BRIEF SUMMARY OF THE INVENTION

One or more embodiments described in the specification are related to an efficient orientation estimation system that calculates the orientation of an object using magnetic, angular rate, and gravity data. The object may be for example a virtual reality headset or a sensor tracking the orientation of a user in a virtual reality environment.

One or more embodiments described in the specification are related to a low-latency virtual reality display system. Embodiments of the system use efficient approximations to rerender virtual reality displays quickly in response to changes in the position or orientation of a user. This efficient and rapid rerendering reduces latency and improves the user's virtual reality experience.

One or more embodiments of the system include one or more displays viewable by a user. For example, these displays may be embedded in virtual reality goggles or glasses. One or more embodiments also include one or more sensors that measure aspects of the user's position, orientation, or both. Aspects of the user's orientation and position are referred to as the user's "pose" in this specification. Pose sensors may for example measure movements of the user's head, or of the user's eyes, or more generally of any body part or parts of the user. Embodiments of the system include a pose analyzer that receives sensor data and determines the user's pose from this data. The pose information is passed to a scene renderer, which generates the 3D virtual reality display viewed by the user. This display shows a portion of a 3D scene model that is visible to the user based on the user's current pose. The 3D scene model is the model of the virtual world that the user navigates through by changing pose.

The scene renderer generates one or more 2D projections from the 3D scene model. In one or more embodiments, these projections may be generated using well known 3D graphics techniques, for example using virtual cameras and perspective projection transformations onto the view planes of the virtual cameras. The 2D projections are then transmitted to the displays.

In addition, one or more embodiments of the system include an image warper. The image warper is the system component that provides for low-latency virtual reality display via efficient rerendering of scenes. The image warper may for example monitor the pose changes of the user and rerender displayed images based on these pose changes. The rerendering performed by the image warper may be a rerendering approximation, rather than a full perspective projection from the original 3D scene model. For example, some embodiments perform rerendering approximations by warping display images in relatively simple ways to partially reflect the changes in the user's pose. These rerendering approximations may offer lower latency display updates, although in some embodiments they may not be fully realistic compared to the full rendering process.

One or more embodiments of the system perform approximate rerendering by calculating a pixel translation vector, and then translating pixels of the display by this pixel translation vector. Effectively the image warper in these embodiments may shift pixels in a calculated direction and by a calculated amount to approximate the effect of the user's movements on the display. This approximation is not full 3D rendering, but it can be performed very quickly in some embodiments, greatly reducing latency between user's movements and display updates.

One or more embodiments of the system may use hardware acceleration to modify the pixels of a display to perform approximate rerendering. For example, display hardware or graphics processing unit hardware may support commands to directly shift pixels based on a pixel translation vector. Implementing pixel translations or other approximate rerendering transformations in hardware may further reduce latency in one or more embodiments.

In one or more embodiments, the rerendering approximations performed by the image warper may only be performed if the pose changes of a user are below a particular threshold value. For large changes in pose, the approximations used by the image warper may become inadequate, and it may be preferable to perform a full 3D rendering despite the high latency. For small changes in pose, the rerendering approximations may be sufficiently realistic.

In one or more embodiments, multiple pose changes for a user may be received while a full 3D rendering process is executed. By the time the 3D rendering process has completed, the initial user pose that was used for the rendering may be out of date, since newer pose data is by then available. One or more embodiments may perform a post-rendering correction on the rendered images, using the image warper to apply updates to the rendered images prior to displaying them. These post-rendering corrections may improve synchronization between the displayed images and the user's current pose.

One or more embodiments of the system may use pose prediction to calculate or estimate the pose of a user at a future time when the rendering and display processes are complete. Pose prediction may reduce the apparent latency between changes in user pose and corresponding display updates. One or more embodiments may use pose prediction for full rendering, for image warping, or for both. Embodiments may use any desired technique for pose prediction, including for example simple extrapolation of pose changes. With pose prediction, the predicted pose is provided to the rendering or approximate rerendering processes, rather than the measured pose. The rendering process calculates virtual camera poses from the predicted pose values, and renders a scene based on these virtual camera poses. The image warper calculates pose changes using the difference between the predicted future pose and the previously calculated virtual camera pose from full rendering of the scene.

One challenge faced by some embodiments is that the image warping process may leave holes in the display images with missing pixels. For example, if all pixels are shifted to the right, then the left edge of the display will have a hole without pixel data. Embodiments may employ various approaches to handle these holes. In one or more embodiments, the 3D renderer may render 2D projections that are larger than the display area. Pixels outside the display area may be cached in these embodiments in an off-screen cache, and retrieved when performing image warping to fill holes.

Another approach to filling holes employed by one or more embodiments is to estimate pixel values for the holes based on the pixel values of nearby pixels. For example, in one or more embodiments pixel values from the boundaries of regions may be propagated into the holes to fill them. Simple propagation of boundary pixels into holes may in some cases result in visual artifacts. In one or more embodiments, blur transformations may be applied to pixels in the holes or near the holes to reduce these artifacts.

One or more embodiments may employ various types of rerendering approximations for image warping. One technique used by some embodiments is to generate a simplified 3D model from the 2D projections received from the scene rendered, and to reproject these simplified 3D models onto the updated view planes that correspond to changes in the user's pose. For example, one or more embodiments may create a simplified 3D model by mapping a 2D projection from rendering onto another plane in the simplified 3D model, where the distance of this plane from the user reflects an average or typical depth of the objects in the complete 3D scene model. The depth of such an average plane may be fixed, or it may be supplied by the scene renderer with each 2D projection. One or more embodiments may use other simplified 3D models, such as spherical or cylindrical surfaces for example.

For small changes in pose, rerendering approximations based on reprojecting from a simplified 3D planar model may be approximately equivalent to using a pixel translation vector to shift pixels in display images in response to pose changes. For example, one or more embodiments may calculate a pixel translation vector for a rotation of a user around axis $\hat{\omega}$ by a small angle $\Delta\theta$ as $(\hat{\omega}_y\Delta\theta, -\hat{\omega}_x\Delta\theta)$, which is then scaled to the reflect the pixel dimensions of the display. This formula reflects that small angular rotations of a user's view approximately result in pixels shifting in response to the rotations, with the amount of shift proportional to the angle of rotation. Changes in user pose may also involve translations (linear motions of the user). For translations, the amount of shifting of pixels is also a function of the distance of objects from a user: the closer the object to the user, the more pixels shift in response to user translations. In one or more embodiments, a rerendering approximation may be estimated by a pixel translation vector using an average depth estimate $z^*$ for the distance between the user and the objects in the 2D projection. These embodiments may calculate a pixel translation vector for a user translation by small vector $\Delta r$ as $(-\Delta r_x/z^*, -\Delta r_y/z^*)$, which is then scaled to reflect the pixel dimensions of the display. This formula reflects that objects that are further away shift less than objects that are closer. It also reflects that pixels shift in the direction opposite to the movement of the user. One or more embodiments may user pixel translation vectors for rerendering approximations that combine the above effects of user rotation and user translation, such as for example $(\hat{\omega}_y\Delta\theta-\Delta r_x/z^*, -\hat{\omega}x\Delta\theta-\Delta r_y/z^*)$.

In summary, embodiments of the invention enable a low-latency virtual reality display by using techniques to efficiently and approximately rerender images based on changes in the user's pose. Such techniques include, but are not limited to, shifting pixels by a pixel translation vector that is calculated from the user's movements. One or more embodiments may provide additional features such as filling of holes generated by image warping, and applying corrections prior to displaying rendered images to synchronize them with the user's current pose.

One or more embodiments of the invention enable efficient estimation of the orientation of a virtual reality headset or of any other object, using for example sensors attached to, mounted on, or embedded in the object. Sensors may include for example a three axis magnetometer that measures a magnetic field, a three axis rate gyroscope that measures an angular velocity, and a three axis accelerometer that measures gravity (plus acceleration of the object). Sensor data received from sensors attached to an object is typically measured with respect to the sensor reference frame. Generally the desired orientation used in applications, such as for example virtual reality, is the orientation of the sensors (and hence of the object) relative to an Earth reference frame. One or more embodiments include one or more processors that receive sensor data and process this data to derive the sensor orientation. These processors may be for example, without limitation, microprocessors, computers, laptop computers, desktop computers, tablet computers, server computers, mobile devices, application specific hardware, digital signal processors, or networks or arrays of any of these processors. In one or more embodiments the processor or processors process sensor data using an iterative algorithm that updates the orientation estimate at discrete steps, for example when new sensor data is available. The sensor orientation is initially set to an initial value, based for example on known or estimated initial conditions. As new sensor data is available, one or more embodiments perform several steps to derive an updated sensor orientation. For example, the current sensor orientation may be inverted and applied to rotate known reference vectors to determine predicted values of the magnetic field data and the acceleration data in the sensor reference frame. The Earth reference frame may be chosen for convenience in order for example to align a vertical axis with the gravity vector, and to align one of the horizontal axes with the horizontal component of the Earth's magnetic field; rotating these axes by the inverse of the sensor orientation then generates the predicted measurements. A measured value for the horizontal magnetic field, in the sensor reference frame, may be obtained projecting the magnetic field vector onto the acceleration, and subtracting this projection from the total magnetic field vector. The predicted acceleration (gravity) vector and the predicted horizontal magnetic field vector may then be compared to the actual measurements of horizontal magnetic field and acceleration received from the sensors. One or more embodiments may generate error vectors by taking the vector cross product of the predicted vectors with the measured vectors. These cross products provide rotation axes that rotate predicted values into the measured values. They may therefore be added to or otherwise combined with the angular velocity measurement to form a derivative of the sensor orientation. Integration of this orientation derivative then yields an updated value for the sensor orientation.

One or more embodiments may use any desired representation for the sensor orientation. The sensor orientation may be defined for example as a rotation that rotates any vector in the sensor reference frame into the corresponding vector in the Earth reference frame. One or more embodiments may represent this rotation as a unit quaternion, for example. One or more embodiments may use any other representation of a rotation, such as for example Euler angles or rotation matrices. A rotation from the Earth reference frame to the sensor reference frame is the inverse of the sensor orientation rotation. For a quaternion representation of rotations, this inverse is the quaternion multiplicative inverse, which is equal to the quaternion conjugate.

One or more embodiments using unit quaternions may form an orientation derivative by multiplying one half of the sensor orientation times the angular velocity. One or more embodiments may add error vectors to the angular velocity to form an orientation derivative. For example, one or more embodiments may add a gravity error multiplied by a gravity error proportional gain, and may add a magnetic field error multiplied by a magnetic field error proportional gain. Error vectors may be calculated for example using cross products, as described above.

One or more embodiments may use a generalized PID feedback controller algorithm to form an orientation derivative. For example, one or more embodiments may add multiple error terms to the angular velocity prior to multiplying by one half the sensor orientation quaternion. Error terms may be for example proportional terms, integral terms, and derivative terms, for each of the gravity error and the magnetic field error. Different gains may be applied to each error term. One or more embodiments may use any variation of a PID controller, such as for example a PI, PD, or P controller.

One or more embodiments may use any or all of the techniques described above to estimate the orientation of a user in a virtual reality environment. For example, in one or more embodiments a virtual reality headset may include magnetic, angular rate, and gravity sensors. The techniques described above may be used to estimate the orientation of the headset relative to an Earth reference frame from the sensor data. This headset orientation may be used to render images for a virtual reality displays. The low-latency rendering techniques described above may be used to reduce latency between changes in orientation and updates to the virtual reality displays.

BRIEF DESCRIPTION OF THE DRAWINGS

The above and other aspects, features and advantages of the invention will be more apparent from the following more particular description thereof, presented in conjunction with the following drawings wherein:

FIG. 8A shows a swimlane diagram for an embodiment of the system that use pose prediction to reduce apparent latency between pose changes and display updates.

FIG. 9 illustrates an embodiment of the system that renders a scene larger than the display into an offscreen buffer, in order to fill holes generated by low-latency rerendering transformations.

DETAILED DESCRIPTION OF THE INVENTION

An efficient orientation estimation system using magnetic, angular rate, and gravity sensors will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
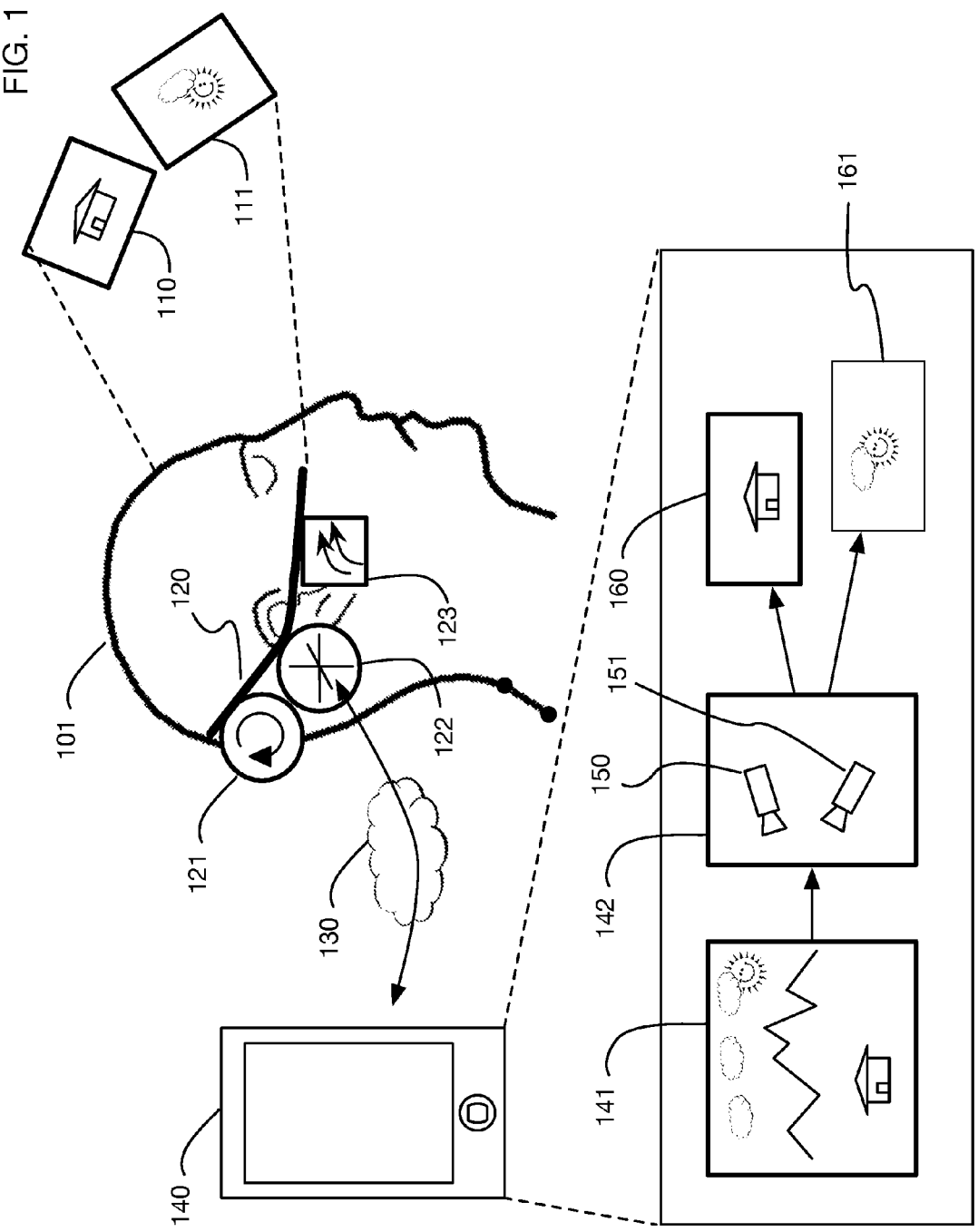
FIG. 1 illustrates the key components of at least one embodiment of a low-latency virtual reality display system, configured for illustration with displays, sensors, and some processing modules embedded in virtual reality goggles, and rendering performed by a wirelessly connected mobile device.

FIG. 1 shows a high-level schematic diagram of an embodiment of the invention that embeds elements of the system into virtual reality goggles. Other embodiments may embed elements of the system into any other devices wearable by or viewable by one or more users. For example, without limitation, one or more embodiments may embed elements of the system into goggles, glasses, sunglasses, monocles, helmets, visors, binoculars, contact lenses, or ocular implants. Some embodiments may not be worn by users, but may be placed on walls, in televisions, in mirrors, on ceilings or floors, inside flight simulators or other simulators, in windshields, in windows, or in or on any other location where a virtual reality experience is desired.

In FIG. 1, user 101 wears a head-mounted device 120 that incorporates several elements of the embodiment shown. Displays 110 and 111 are in front of the user's left and right eyes, respectively. These displays are shown offset from user 101 for exposition; in reality many embodiments may position displays of head-mounted devices directly in front of the user's eyes. While the embodiment shown has two displays—one for each eye—embodiments may use any number of displays, including for example only a single display, or two displays as shown in FIG. 1, or more than two displays. In FIG. 1, the images shown on displays 110 and 111 are different; this may be useful in one or more embodiment for example to provide a stereoscopic 3D display. One or more embodiments may use the same image for multiple displays.

Device 120 includes a sensor (or multiple sensors 121). Sensor 121 measures some aspect of the position or orientation of user 101, or of changes thereto. The position and orientation of an object in three-dimensional space is referred to in the art as the "pose" of that object. Hence sensor 121 is a type of pose sensor. One or more embodiments may measure any desired aspects of the pose of any body parts of user 101. For example, in some embodiments sensor 121 may measure the pose of the user's head. In some embodiments sensor 121 may measure the pose of one or more of the user's eyes. Combinations of pose measurements for different body parts may also be used in one or more embodiments. Examples of sensors that may be used in one or more embodiments include, without limitation, accelerometers, gyroscopes, GPS trackers, ultrasonic rangefinders, pressure sensors, video cameras, altimeters, radars, sonars, magnetometers, flow meters, Doppler shift meters, or tilt sensors. Embodiments of the system may use only a single sensor, or multiple sensors. Some embodiments may use one or more sensors that directly measure some aspect of the pose of a body part of the user; for example, a magnetometer may provide partial orientation information directly. Some embodiments may use one or more sensors that indirectly measure pose; for example, a gyroscope may measure angular velocity, which must be integrated to yield orientation. The schematic of FIG. 1 shows sensor 121 located near the back of the head of user 101; this location is arbitrary and may vary in different embodiments of the invention. For example, an embodiment that uses a video camera eye tracker to measure the orientation of a user's eye may be mounted near the user's eyes. One or more embodiments may use multiple sensors at different locations of a user's body. One or more embodiments may use sensors that are not mounted on the user's body at all, but that measure some aspect of the pose of a user or one or more of the user's body parts. For example, one or more embodiments may use video cameras located near the user, and may analyze images from these cameras to determine the user's pose.

In FIG. 1, device 120 also includes pose analyzer 122. This element receives sensor data from the sensor or sensors 121, and uses this data to calculate the pose of one or more body parts of user 101. The calculations made by pose analyzer 122 will in general depend on the type of sensor or sensors 121. For example, one or more embodiments may use inertial sensors for the sensors 121, in which case the pose analyzer 122 may execute an inertial tracking algorithm to estimate the position and orientation of the user. Such inertial tracking algorithms are well known in the art. Embodiments may use any methodology to translate the raw sensor data into pose information. One or more embodiments may use more than one pose analyzer; for example, an embodiment with eye tracking sensors may use a separate pose analyzer for each eye. While FIG. 1 illustrates an embodiment with pose analyzer 122 mounted on device 120 that is attached to the user, embodiments may use pose analyzers that are not attached to the user, or may use a combination of pose analyzers on a user-mounted device and pose analyzers remote from the user.

In general a virtual reality device generates virtual reality display images based on the user's pose. For example, as a user moves or turns, different images are displayed to simulate the real experience of viewing different parts of a scene. This functionality requires a 3D model of one or more scenes, and a rendering system that renders views of the scene based on the user's pose. In the embodiment shown in FIG. 1, the 3D scene model 141 and the scene renderer 142 are located in mobile device 140. This mobile device 140 communicates with the head-mounted device 120 over a wireless network 130. This separation of functionality between a head-mounted device and a remote device is only illustrative; embodiments may use any desired architecture to organize elements of the system into devices. For example, in one or more embodiments, all elements of the system may be incorporated into a device such as head-mounted device 120 that is worn by a user. In one or more embodiments, all of the elements of the system may be remote from the user: for example, the user's orientation may be detected by video cameras in a room, the pose analyzer and scene renderer may execute on computers in the room, and the rendered images may be displayed on monitors mounted on the walls of the room. In one or more embodiments, the system may be a distributed system with elements distributed over multiple nodes that communicate over a network; for example a 3D scene model may be hosted on a remote server, rendering may be done on a device that is local to the user but not attached to the user, and the sensors and displays may be on a user-mounted device. Embodiments may use any type of network communication between elements of the system, including wired or wireless networks, or combinations thereof. Any network media and network protocols may be used to communicate between elements of the system.

3D scene model 141 contains a 3D representation of the objects that may be displayed to the user; it is a model of the 3D "virtual world." This scene model may be static, or it may change over time. Dynamic 3D scene models may also change in response to user actions or to changes in user pose. The 3D scene model may include computer-generated elements, real scene data captured by cameras or 3D scanners, or combinations of computer-generated and real data. Embodiments may use any desired type of 3D scene model, and any desired data representation for the scene model such as for example, without limitation, VRML, X3D, OBJ, COLLADA, Blender, 3DS, or any other proprietary or open format for 3D information.

Scene renderer 142 generates one or more rendered 2D images from scene model 141. In one or more embodiments of the system, the scene render generates one or more "virtual cameras" based on the pose data received from pose analyzer 122. These virtual cameras have a location and orientation in the 3D space defined by the 3D scene model. In the embodiment shown in FIG. 1, scene renderer 142 generates two virtual cameras 150 and 151, each of which corresponds to one of the two displays 110 and 111. Embodiments may use any number of virtual cameras and associate these virtual cameras in any desired manner with displays. Rendering generates a 2D projection for each of the virtual cameras. Techniques for rendering 2D projections from 3D scenes are well known in the art, and these techniques are implemented in many readily available software libraries and graphics processing units. Embodiments may use any of the well known techniques, software packages, or devices for 3D rendering to generate 2D projections. In the embodiment illustrated in FIG. 1, virtual camera 150 generates 2D projection 160, and virtual camera 151 generates 2D projection 161. 2D projections 160 and 161 are transmitted back to device 120 over network 130. These projections may be displayed directly on displays 110 and 111.

In the embodiment shown in FIG. 1, device 120 includes image warper 123. The image warper provides a low-latency "rerendering" of the projections 160 and 161 for certain types of changes in the user's pose. Specifically, the image warper receives data on the virtual camera poses 150 and 151 that were used to generate projections 160 and 161. It also receives updates to the user's pose from pose analyzer 122. By comparing the user's new pose to the virtual camera poses used to render the 2D projections, the image warper calculates a change in pose. When a user's pose changes, the full rendering path to generate new 2D projections would require another iteration of the original rendering path: pose data would be sent to device 140, and converted to virtual camera poses 150 and 151; then scene renderer 142 would generate new 2D projections from 3D scene model 141, and transmit these new 2D projections back to device 120. This full rendering path may be relatively slow, leading to observable latency for the user. The function of the image warper is to reduce this latency by performing a rapid "rerendering approximation" that provides a relatively quick and efficient update to the images 110 and 111 based on changes to the pose. This rerendering approximation is not a complete rendering as would be performed by the scene renderer 142; instead it uses approximations to reduce the calculations and communications required to update the display, thereby reducing latency. Illustrative details of how various embodiments may perform image warping are provided below.

Figure 2:
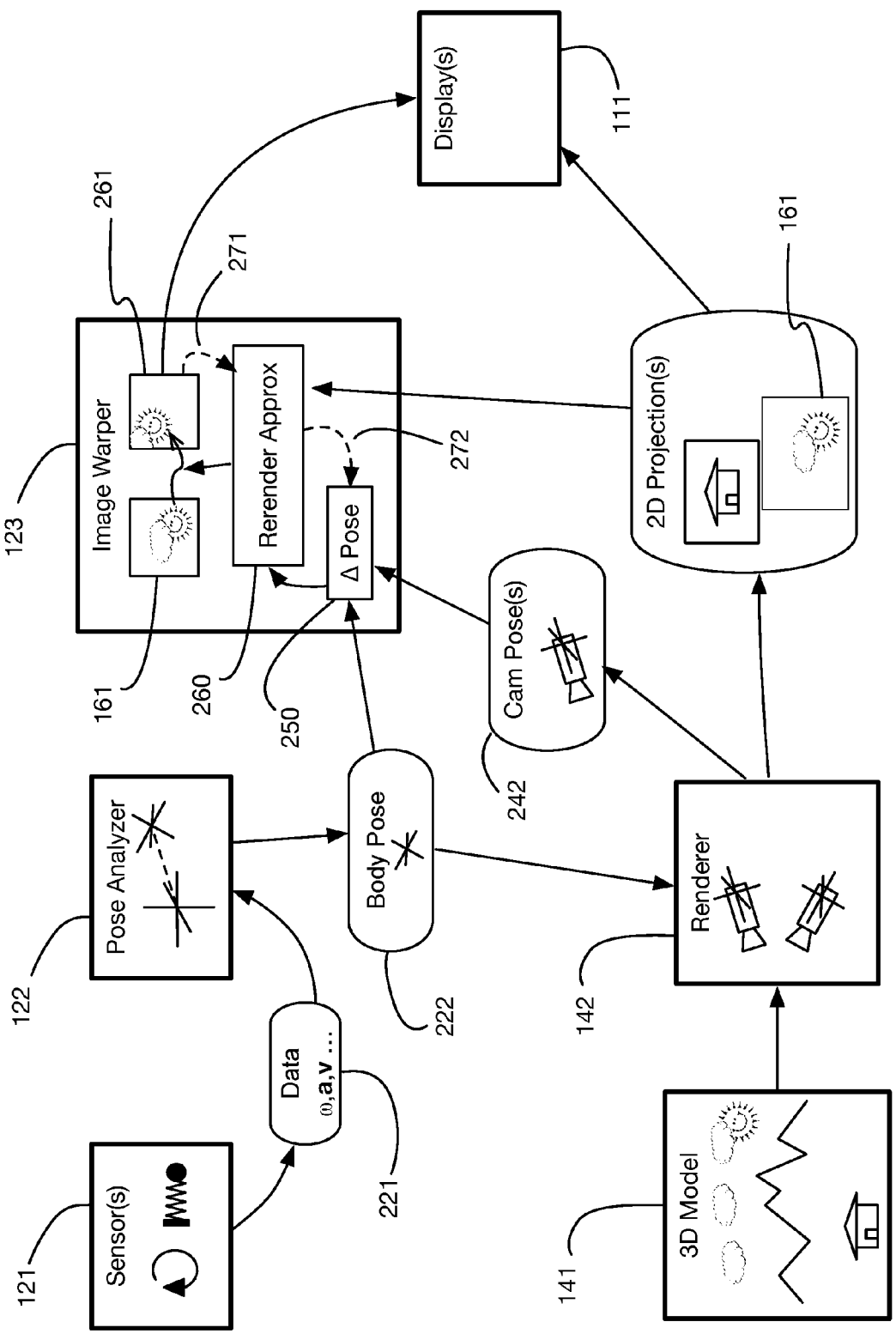
FIG. 2 shows a high-level architectural view of the embodiment shown in FIG. 1.

FIG. 2 shows a conceptual block diagram of the embodiment of FIG. 1, illustrating the main data paths. Sensor (or sensors) 121 generate sensor data 221. This sensor data may include, for example, angular velocity data, acceleration data, velocity data, or any other data generated by any of the types of sensors discussed above or any sensor that may measure any aspect of the pose of a user's body part. The sensor data 221 is sent to pose analyzer 122, which generates body pose 222 from the sensor data. Body pose 222 may include multiple poses, depending on the embodiment; for example in one or more embodiments with eye trackers, body pose 222 may have a separate pose for each of the user's eyes. Body pose 222 is sent to scene renderer 142, which takes 3D scene model 141, and renders one or more 2D projections such as 161. 2D projections 161 are sent to displays 111. The scene renderer 142 also generates virtual camera poses 242 for the virtual camera or virtual cameras used to generate the 2D projections. For some subsequent changes in pose, the new body pose 222 and the virtual camera pose 242 may be sent to image warper 123. Embodiments may use various techniques to determine when, whether, and how to use rerendering via the image warper vs. full rendering iterations via the scene renderer. Image warper 123 calculates a change in pose 250. The change in pose 250 and the original 2D projections 161 are sent to the rerendering approximation 260, which performs the image warper to transform 2D projection 161 into modified 2D projection 261, which is then sent to display 111. In some embodiments the rerendering approximation process may be repeated multiple times before another full rendering of the scene. Embodiments may employ various techniques for repeated rerendering approximations. In some embodiments for example the repeated rerendering may be "iterative": warped projection 261 may be sent back to the rendering approximation 260 on path 271, for another iteration of warping when a new body pose 222 is available. In these iterative embodiments of repeated rerendering, the pose of the last warped image may also be provided on path 272 to the pose change calculation 250 so that pose changes represent only the change from the last warped image. In other embodiments the repeated rerendering may instead by "cumulative": original 2D projection 111 may be saved, and repeated rerendering approximations may be performed on the original projection rather than on the last warped image. Some embodiments may employ combinations of these iterative and cumulative rerendering approaches.

Figure 3:
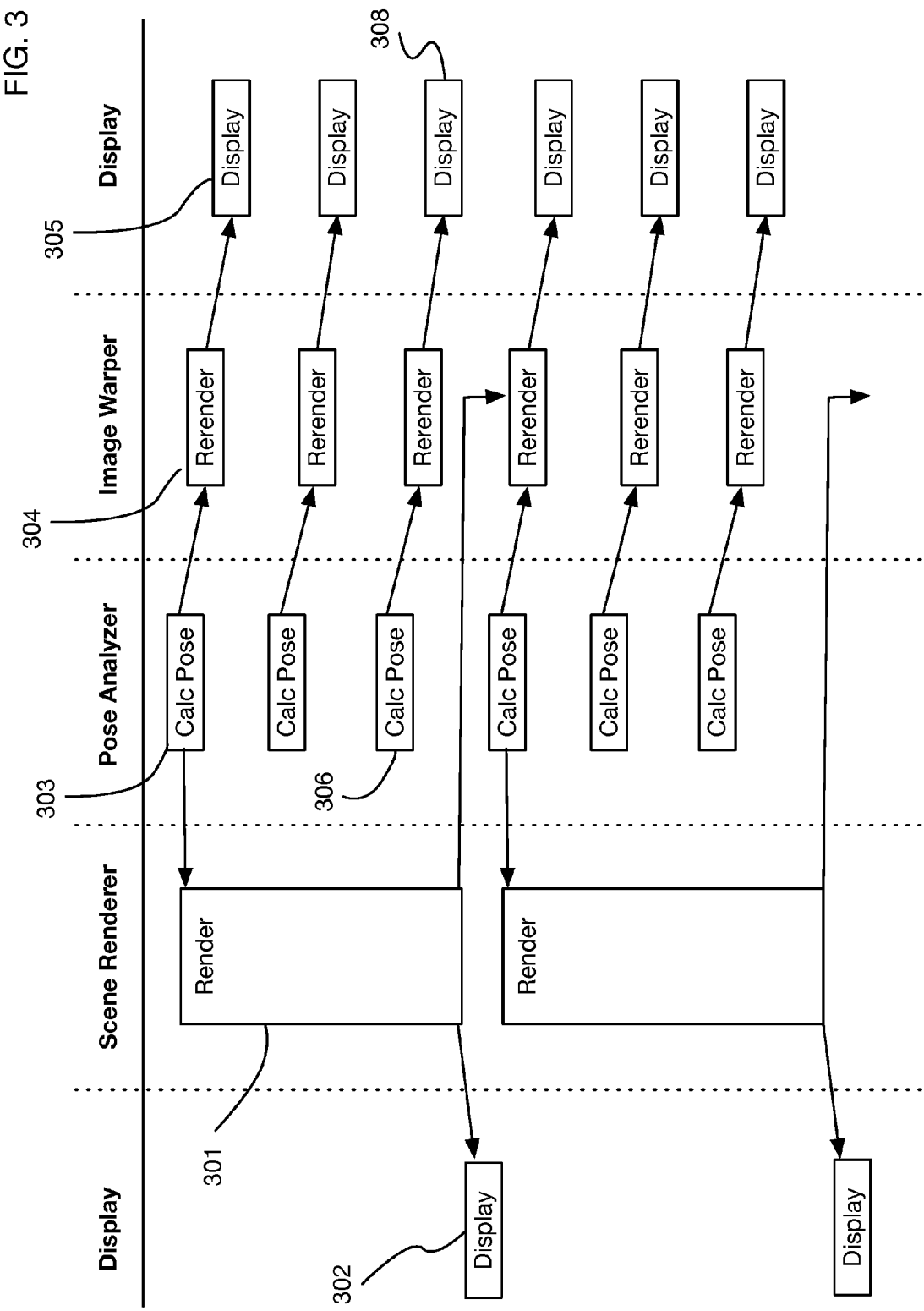
FIG. 3 shows a swimlane diagram for the major rendering activities of the embodiment shown in FIG. 2.

FIG. 3 shows an illustrative "swimlane" process timing diagram of some of the key steps described above. This diagram presumes that a 3D scene has been previously rendered and is currently displayed on the displays. Initially the Pose Analyzer calculates a pose at 303, and sends this pose to the Scene Renderer. The Scene Renderer launches a Render process 301 which is time-consuming. If the system waited for the Render process 301 to complete, the display would not be updated until the new display 302 is available. To provide a lower latency display that is responsive to user's movements, the Pose Analyzer sends the pose 303 to the Image Warper as well. The Image Warper executes a rapid Rerender process at 304 to modify the current display based on the change in pose. This Rerender process finishes quickly resulting in new display 305. This example illustrates how the Image Warper provides for a lower latency virtual reality display, by executing a fast, approximate rerendering to update a display rather than waiting for a time-consuming full rendering process.

In FIG. 3, this process of rerendering repeats a second time while the Render process 301 is calculating, and then a third time when pose calculation 306 is sent to the Image Warper for rerendering, to generate display 308. After Render 301 is complete, the new 2D projection is available for subsequent rerendering steps. In this illustrative embodiment, full Rendering 301 and approximate Rerendering 304 are interleaved. Some embodiments may employ different strategies to mix full rendering and approximate rerendering as desired. The timing shown in FIG. 3 of three approximate rerendering steps occurring while full rendering is executing is simply illustrative; embodiments may employ any desired or required frequency and timing of these steps based on latency requirements, processor capacity, and the types of rerendering approximations used.

Figure 4:
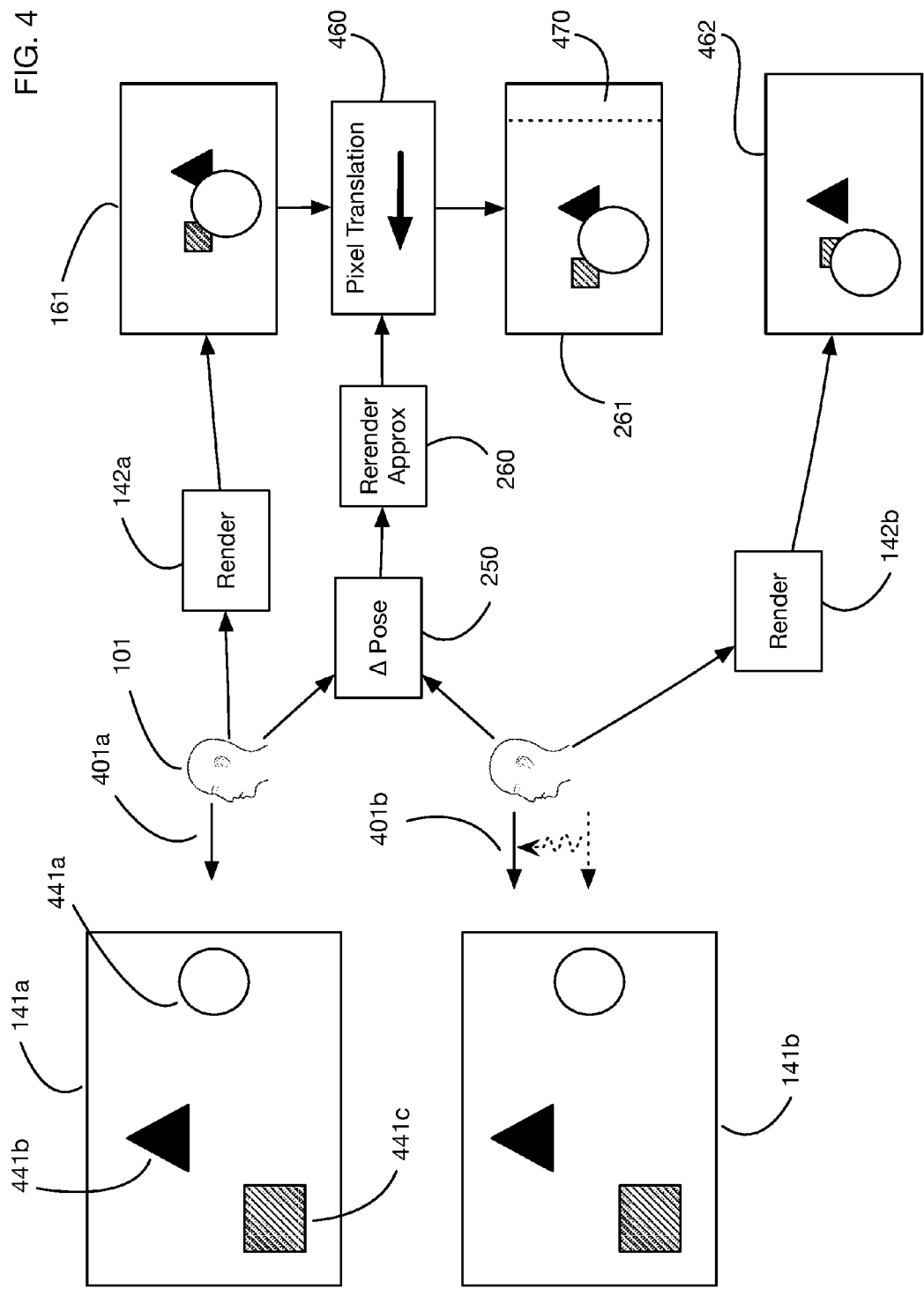
FIG. 4 illustrates an embodiment of the system that implements low-latency rerendering using a pixel translation.

Embodiments of the system may employ various types of approximate rerendering techniques to achieve the desired latency. In one or more embodiments, the approximate rerendering consists of or includes a pixel translation that simply shifts all pixels of the 2D projection by an appropriate pixel translation vector. One advantage of this approach is that pixel translation can be executed very rapidly; for example in some embodiments it may be achieved simply by modifying an offset address for the display memory used by a graphics processing unit. In some embodiments pixel translation may be supported directly by the display hardware. FIG. 4 illustrates an embodiment that uses a pixel translation vector for rerendering approximation. Initially user 101 has a pose indicated by view vector 401*a*. The user is observing 3D scene model 141*a*, which includes for illustration three objects: a sphere 441*a*, a pyramid 441*b*, and a box 441*c*. (These objects are illustrated in two dimensions in FIG. 4 for simplicity, but in general the 3D scene models may contain three dimensional shapes.) The objects are located at different distances from the user 101, with 441*a* closest and 441*c* furthest away. The render process 142*a* generates 2D projection 161. As illustrated in 161, the rendering process shows the depth of the various objects, with the sphere 441 appearing largest since it is closest to the user. The rendering process also reflects occlusion of objects; since sphere 441*a* is in front, it partially obscures objects 441*b* and 441*c*.

After this initial rendering, user 101 moves to the right, with new view vector 401*b*. The new pose of the user (which reflects the new view vector) is compared to the original pose with the pose change comparator 250. This pose change is sent to the approximate rerender 260, which calculates a pixel translation vector 460 that approximates the change to the 2D projection based on the user's movement. Since the user moved to the right, the pixel translation vector is a shift of pixels leftwards. Applying the pixel translation vector 460 to the original 2D projection 161 results in modified image 261. All pixels in the scene are shifted left by the same amount.

FIG. 4 also illustrates how the rerendering approximation differs from a full rendering based on the new pose. If the new pose 401*b* is sent to the Scene Rendering process 142*b*, the resulting 2D projection is 462. This new 2D projection is a fully accurate representation of the user's new view. For example, in the updated 2D projection 462, the sphere 441 shifts leftward more than the box 441*c*, since it is closer to the user. Because the rendering process 142*b* takes the depth of the objects into account in rendering the scene, these relative shifts are correctly rendered. In contrast, the approximate rerendering 260 via pixel translation vector 460 captures the basic movement of the scene—the user moves right so the pixels shift left—but it is nevertheless an approximation that does not take into account the 3D scene model. The advantage of the approximate rerendering is that it can be performed very quickly, particularly with pixel translations, resulting in low latency display that is very responsive to the user's movements. Different embodiments of the system may mix full rendering and approximate rerendering as needed or desired to make the appropriate tradeoffs between accuracy and low latency based on the application.

Figure 4A:
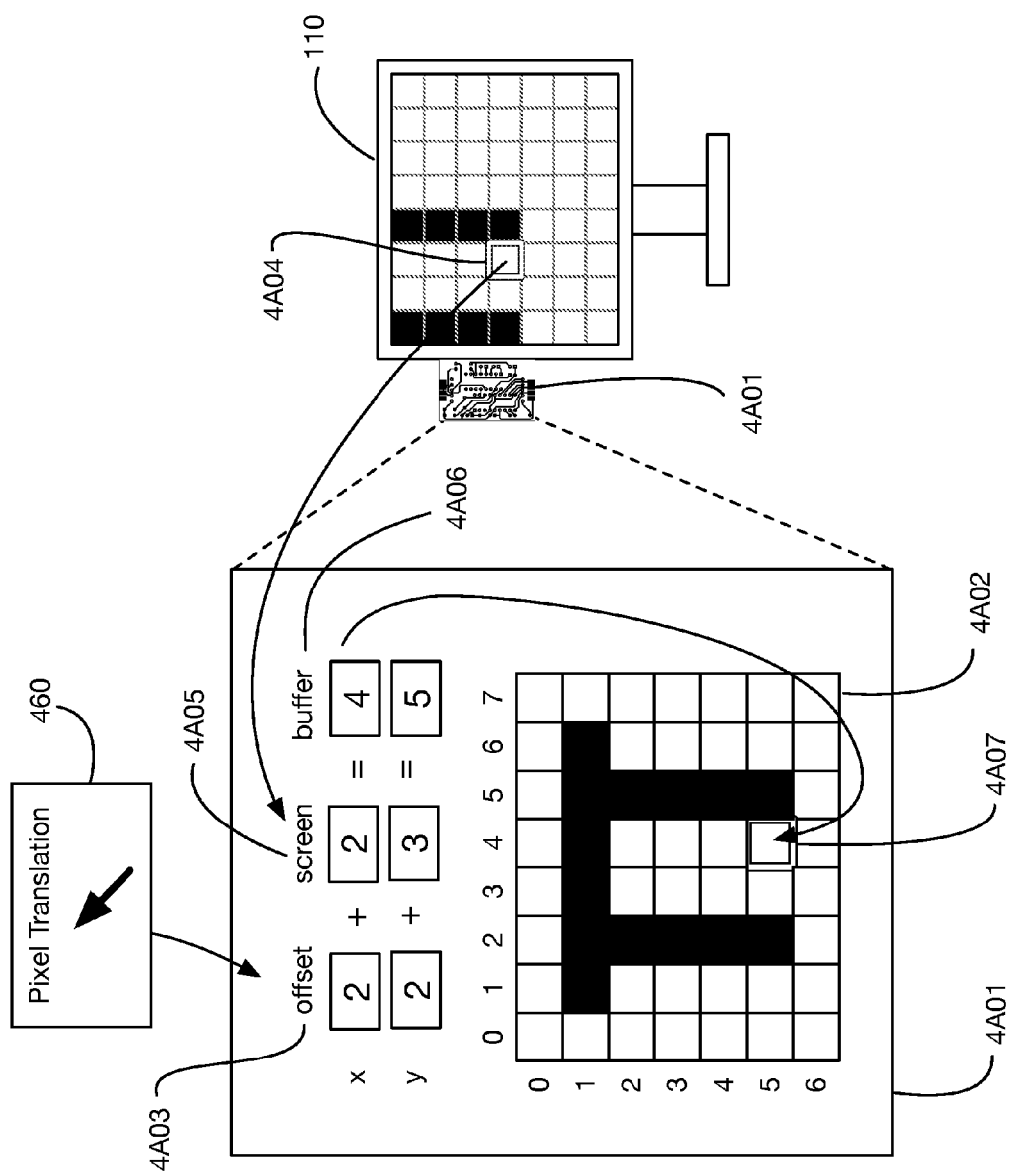
FIG. 4A illustrates an embodiment of the system that uses hardware accelerated rerendering using offset registers for reading frame buffer memory.

One or more embodiments of the system may use hardware acceleration to modify the pixels of a display to perform pixel translations or other image warping operations. FIG. 4A illustrates an example of an embodiment with hardware support for pixel translation in the monitor hardware. In some embodiments hardware support may be provided in graphics processing units or in other system components as well. In FIG. 4A, monitor 110 includes hardware 4A01 that drives the monitor output. This hardware has direct support for implementing pixel translation 460. The monitor hardware includes a frame buffer 4A02 that stores pixel values. To display the pixel value at a screen address 4A05, corresponding for example to pixel 4A04 on the display 110, the hardware adds offsets 4A03 to the screen address 4A05 to obtain a frame buffer address 4A06, which in this example points to frame buffer pixel 4A07. The offset 4A03 is set based on pixel translation 460. Changes to the pixel translation can be rerendered very quickly by the display hardware by updating the offset 4A03. In one or more embodiments the display hardware may provide support for additional image warping features, such as for example filling of holes with interpolated pixel values, blurring of edge regions, rotations in addition to translations, or any other desired warping transformations. One or more embodiments may provide hardware acceleration in other system components instead of or in addition to in display hardware, such as for example in graphics processing units or in coprocessors.

Figure 5:
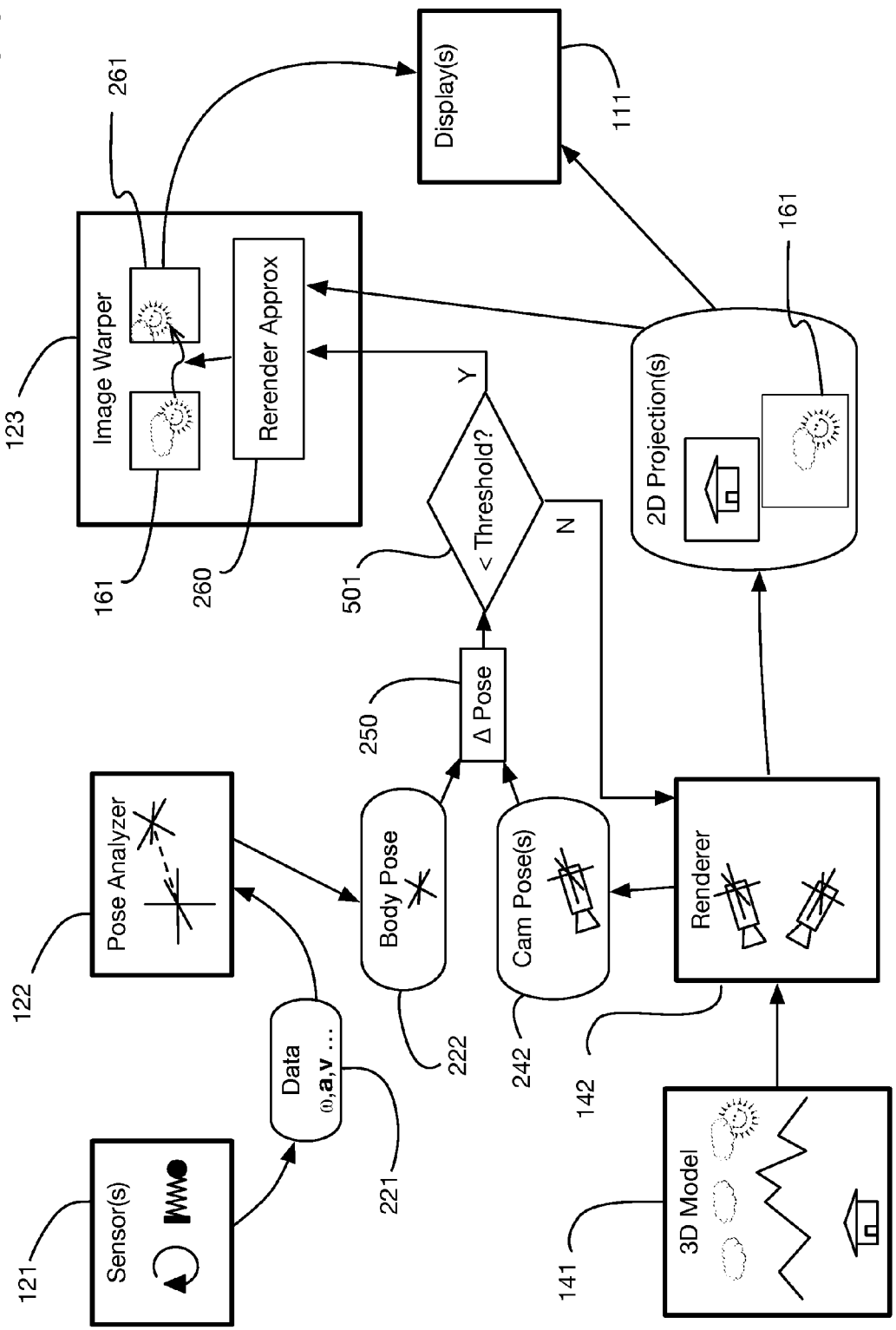
FIG. 5 illustrates an embodiment of the system that executes low-latency rerendering if the changes in a user's pose are below a threshold value.

In one or more embodiments, approximate rerendering may be used only when a user makes relatively small changes in pose. In some cases the accuracy of approximate rerendering may be very good for small changes in pose, but it may be poorer for large changes in pose. Therefore limiting approximate rerendering to small changes in pose may be appropriate in some embodiments. FIG. 5 illustrates an embodiment that employs this strategy. The virtual camera pose 242 used to generate a previous 2D projection is compared to a user's current pose 222 to generate a change in pose 250. This change in pose is compared at 501 to a threshold. If the change in pose is below a threshold, rerendering approximation 260 is executed for a low latency update to the display; otherwise a full rendering 142 is executed to generate new 2D projections 161. Embodiments may use various methods to compare pose changes to threshold values. For example, for pose changes that are translations, the distance moved by the user may be a metric that is compared to a threshold value. For pose changes that are rotations, the angle of rotation may be a metric that is compared to a threshold value. For pose changes that combine translations and rotations, weighted sums of translation distance and angular change may be compared to a threshold, or translations and angle changes may each be employed to respective thresholds. These examples are illustrative; embodiments may use any desired function to compare pose changes to any threshold value or values to decide when to execute approximate rerendering.

Figure 6:
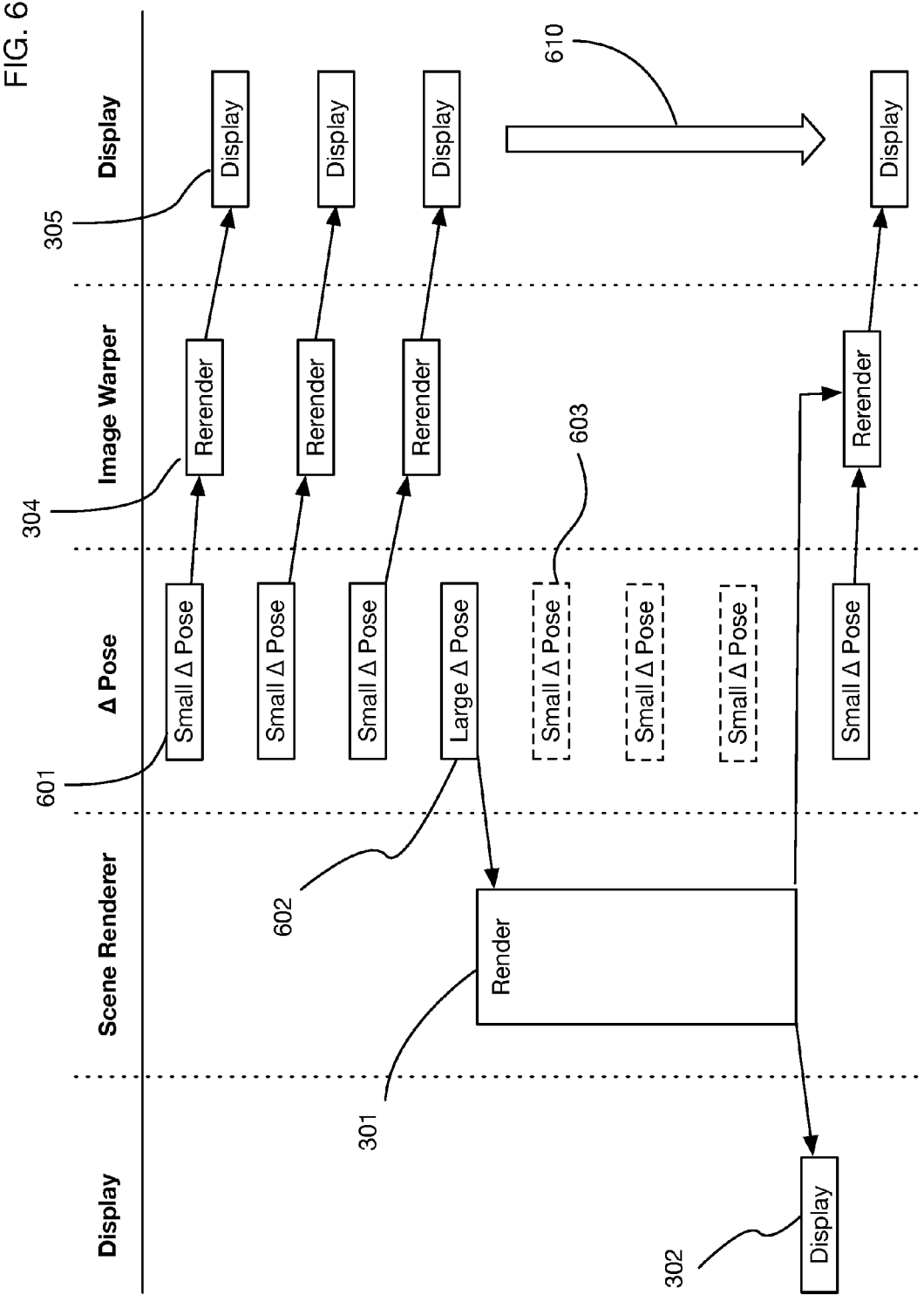
FIG. 6 shows a swimlane diagram for the major rendering activities of the embodiment shown in FIG. 5.

FIG. 6 shows an illustrative swimlane timing diagram for the embodiment shown in FIG. 5 that compares pose changes to a threshold. Pose change 601 is determined to be a small change since it is below the threshold value. Therefore the rerendering approximation 304 is executed to generate display 304. Similarly the next 2 pose changes are small, and rerendering approximations are executed. Afterwards pose change 602 is determined to be large (greater than the threshold); therefore a full rendering operation 301 is initiated. In this illustrative embodiment, the system pauses display updates during time 610 while the rendering process 301 is executing. Thus the next update to the display 302 occurs when rendering 301 is complete.

In some embodiments, naïve parallel interleaving of full rendering and approximate rerendering may result in display updates that appear to be out of sequence. Returning to FIG. 3, the three approximate rerendering steps beginning at 304 execute in parallel with the full rendering process 301. While this parallelism achieves low-latency update of displays (for example at 306 and 308), it may result in timing artifacts that negatively affect the user's experience. For example, the user observes display update 308, which is based on the user's pose 306. Immediately afterwards, the user observes display update 302, which is based on the user's pose 303. Thus the display at 302 may appear to the user to go backwards relative to the most recent display 308 which was generated by a rerendering approximation. For very small changes in pose these artifacts may not be noticeable, but in some embodiments they may compromise the virtual reality experience.

One solution to these timing artifacts is to prevent parallel execution of full rendering and approximate rerendering altogether. Such an embodiment is illustrated in FIG. 6. In this embodiment, approximate rerendering occurs for small pose changes, and full rendering occurs for large pose changes. Moreover, approximate rerendering is paused during full rendering. Thus the user never observes the timing issues that may be visible for example in FIG. 3. However, the embodiment illustrated in FIG. 6 achieves this consistency at the expense of latency: for example the delay 610 in display updates during rendering 301 may be perceived by the user as a lack of responsiveness of the system.

Figure 7:
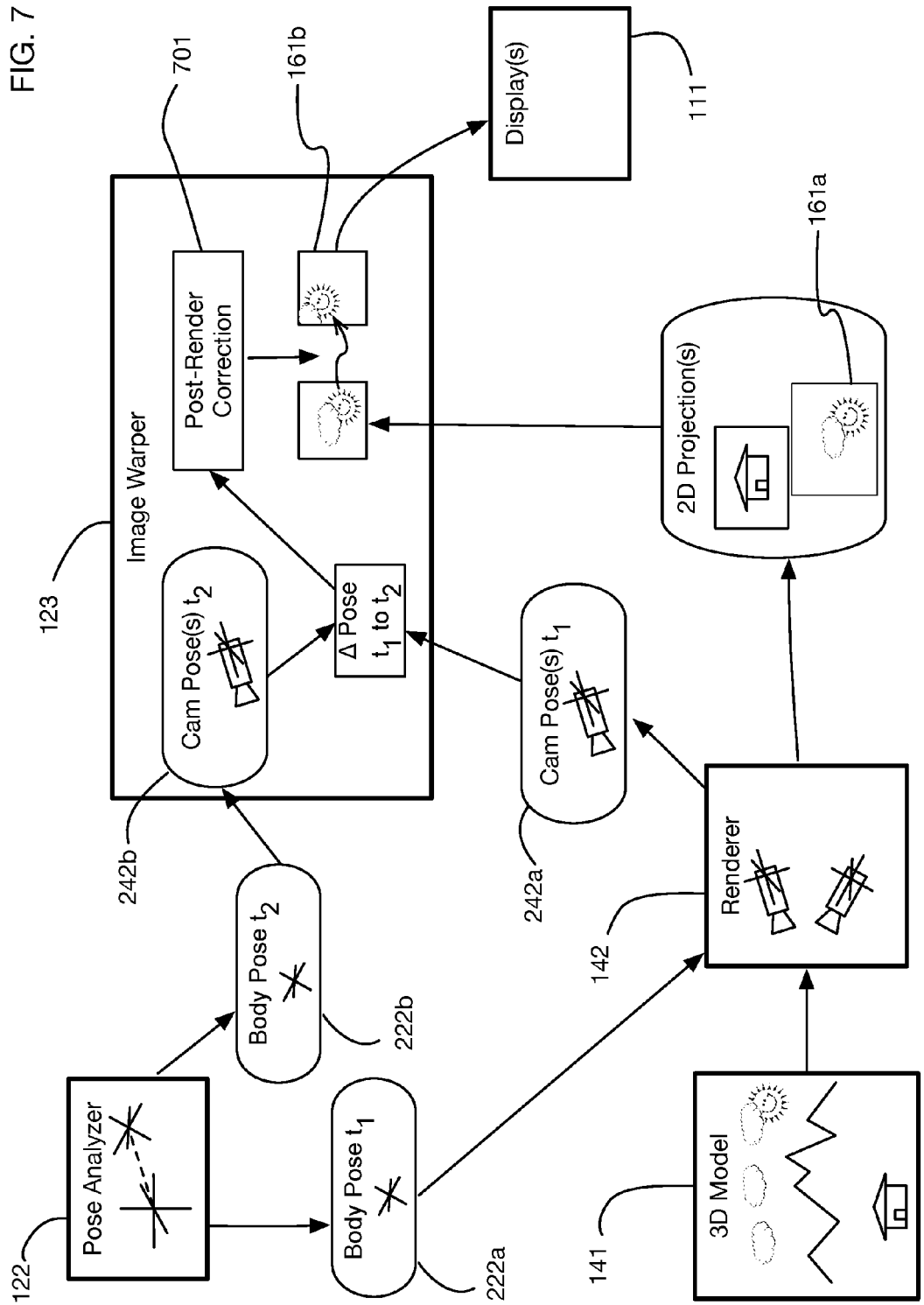
FIG. 7 illustrates an embodiment of the system that performs a post-rendering modification to rendered scenes using a low-latency correction for recent changes in the user's pose.
Figure 8:
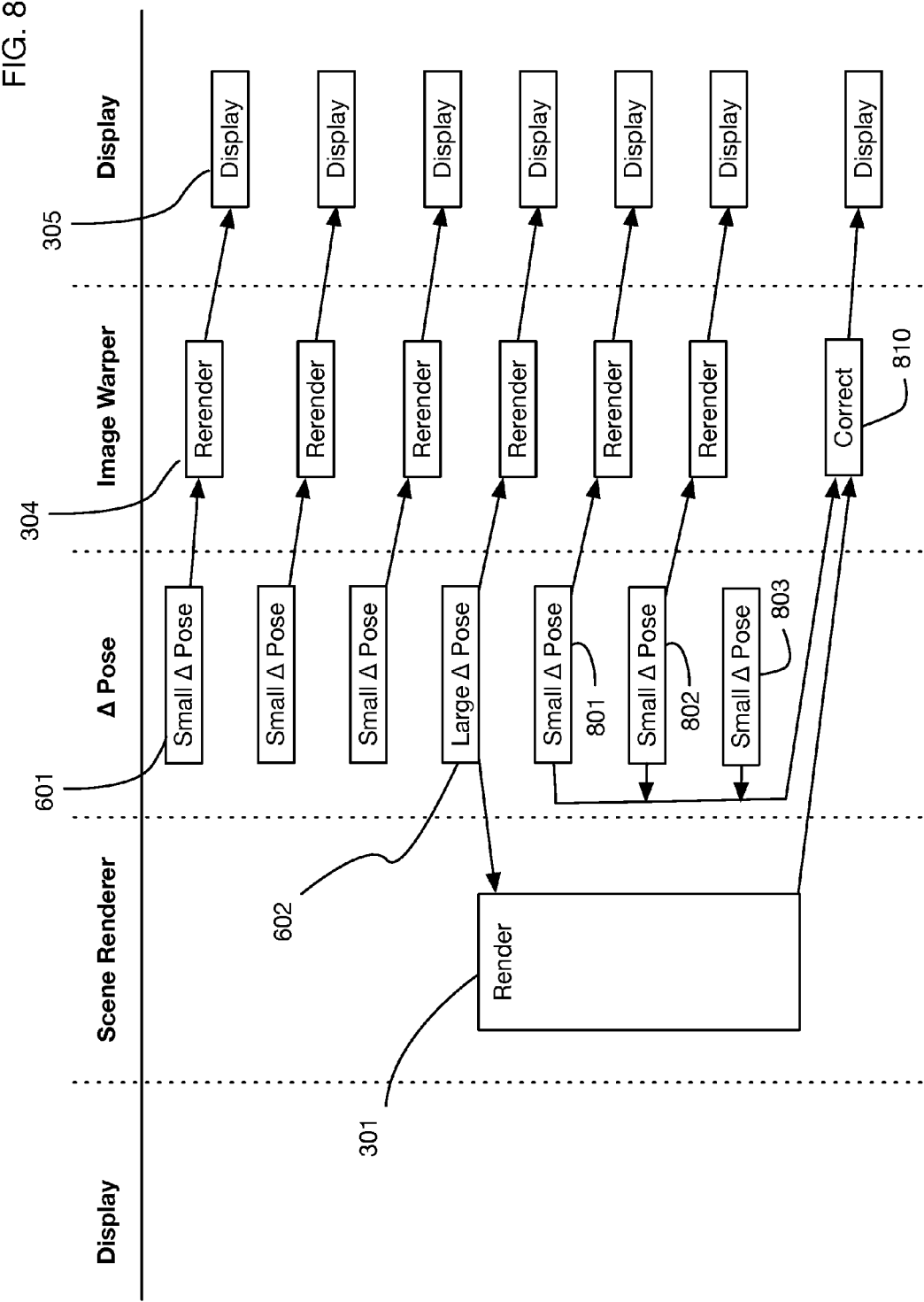
FIG. 8 shows a swimlane diagram for the major rendering activities of the embodiment shown in FIG. 7.

Embodiments of the system may employ a more sophisticated interleaving strategy that achieves consistently low latency without introducing the types of timing artifacts illustrated in FIG. 3. These embodiments generate full rendering in parallel with approximate rerendering, and in addition they perform post-rendering corrections on the fully rendered images to synchronize them with updates that have occurred since the full rendering process began. FIG. 7 illustrates an embodiment that applies post-rendering corrections, and FIG. 8 shows an associated swimlane diagram for the key processing steps. Turning first to FIG. 8, in this illustrative embodiment, small changes in pose generate approximate rerendering, and large changes in pose generate full rendering. For example, pose change 601 is small (compared to a designated threshold value); hence approximate rerendering 304 is executed to generate display update 305, with relatively low latency. Similarly the subsequent two pose changes are small and generate approximate rerendering. Pose change 602 is large; hence the system initiates full rendering 301 which is based on the pose at 602. Because rendering 301 is time-consuming, pose changes 801, 802, and 803 are received during rendering 301. Since each of 801, 802, and 803 are small changes, rerendering approximations are performed to generate display updates for each of these pose changes. After rendering 301 completes, instead of displaying the output of 301 directly, the output of 301 is corrected by process 801 before it is displayed. The correction 810 uses the cumulative pose changes 801, 802, and 803 that occurred after the initiation of 301 to synchronize the display with the most recent pose.

FIG. 7 shows a block diagram of an embodiment that implements the process illustrated in FIG. 8. At time $t_1$ pose 222a is sent to renderer 142. Eventually the renderer generates 2D projection 161a; this projection was based on virtual camera pose 242a, which corresponds to pose 222a at time $t_1$. One or more pose updates have been received and processed between time $t_1$ and the availability of 2D projection 161a; the most recent such update is body pose 222b received at time $t_2$. Therefore the 2D projection 161a is not sent directly to display 111. Instead it is sent to image warper 123, which will correct it for pose changes that have occurred since the beginning of the rendering process. Image warper 123 calculates virtual camera pose 242b corresponding to the most recent body pose 222b, and compares it to the virtual camera pose 242a used for rendering projection 161a. The difference in these virtual camera poses is applied to post rendering correction 701, which modifies 2D projection 161a based on recent pose changes to generate corrected 2D projection 161b, which is sent to display 111. One potential benefit of such an embodiment is that displayed images will reflect the most recent pose data received from the sensors. Another potential benefit is that approximate rerendering may be interleaved in parallel with full rendering for improved latency without introducing timing artifacts.

Approximate rerendering and post rendering correction may significantly reduce the latency between changes in pose and updates to the display that reflect these changes. However, the processes of measuring pose, generating an approximate rerendering, and transferring data to the display, continue to introduce some latency even when these improvements are in place. FIG. 8A illustrates this potential issue. A pose measurement starts at time 8A01 ($t_1$). After pose measurement completes, a rerendering approximation is calculated and transferred to the display; the display update competes at time 8A02 ($t_2$). Although a long-latency full rendering is avoided, there remains elapsed time 8A03 ($\Delta t$) between the start of pose measurement and the completing of the display update. The display update therefore lags the true pose by this amount $\Delta t$.

One or more embodiments may employ pose prediction to further reduce this latency. An example of this approach is illustrated in the lower half of FIG. 8A. A pose measurement 8A05 occurs with resulting pose $Q_1$. Instead of passing this pose $Q_1$ directly to the image warper, the system uses the known delay 8A03 ($\Delta t$) between pose measurement and display to predict what the pose will be at the time 8A30 that the display update will complete. In this illustrative embodiment, an extrapolation of pose changes is made using the previous pose sample 8A04, which measured pose $Q_0$. Assuming sampling interval $\Delta s$ between pose measurements, a pose predication 8A06 is calculated as $Q_2 = (Q_1 Q_0^{-1})^{(\Delta t/\Delta s)} Q_1$. This calculation considers poses to be rigid body transformations of three-dimensional space, with multiplication used to represent composition of these transformations. The predicted pose 8A20 ($Q_2$) is provided to the image warper for the rerendering approximation. Thus the display process which completes at time 8A30 is synchronized with the time of the predicted pose used to generate the display.

This pose prediction calculation 8A06 is an illustrative example; one or more embodiments may use any method to predict a future pose based on one or more previous pose samples and on any other available information. Any method of predicting a future trajectory for the location or orientation of any body part may be used by one or more embodiments. Prediction methods used by one or more embodiments may also for example take into account known constraints on the motion of the user. One or more embodiments may use adaptive pose prediction techniques that monitor the user's movements over time to predict the most likely subsequent movements based on previous movements.

FIG. 8A illustrates the use of pose prediction for image warping. One or more embodiments may use similar pose prediction techniques for full rendering as well. The discussion above for pose prediction for image warping applies to full rendering as well. One or more embodiments may generate a predicted pose that is sent to the full rendering process, where the predicted pose takes into account expected pose changes between the time of the pose measurement and the completion of the display update after full rendering. One or more embodiments may use pose prediction techniques for either or both of image warping and full rendering.

In some embodiments the approximate rerendering transformations applied by the image warper may result in "holes" in the transformed images with missing pixels. For example, returning to the embodiment illustrated in FIG. 4, the image warper shifts pixels to the left via pixel translation vector 460. This results in a "hole" 470 on the right edge of transformed image 261 that is missing pixels. Embodiments may employ various strategies or combinations of strategies to handle these holes. A very simple strategy employed by one or more embodiments is to fill holes with a relatively "neutral" background color; in some applications this may provide sufficient realism for small pose changes. However in other applications this simple approach may not be sufficient.

One or more embodiments may fill holes by rendering 2D projections that are larger than the displays. In these embodiments warping of the larger 2D projection may result in an updated projection that still fits entirely within the display area. FIG. 9 illustrates an embodiment that employs this strategy. In this embodiment, the scene renderer generates an extended 2D projection 901 from 3D model 141; this extended projection is larger than the display area. The displayed image 161 is a subset of the rendered area 901. For illustration we show the effect of an image warper 123 that applies a rightward pixel translation to the image. An embodiment that did not employ a hole-filling strategy would generate transformed image 111a, which has missing pixels in region 911 on the left edge of the display. In the embodiment of FIG. 9, the pixels of the extended rendered projection 901 are saved in an offscreen cache. The image warper then pulls pixels from this offscreen cache as needed to fill holes generated by the warping. In FIG. 9, pixels from the mountain object 920 are pulled from the offscreen cache to fill hole 911, resulting in an improved rerendered projection with object 921 filling the hole. Embodiments may use any desired size and shape for the offscreen pixel cache.

Figure 10:
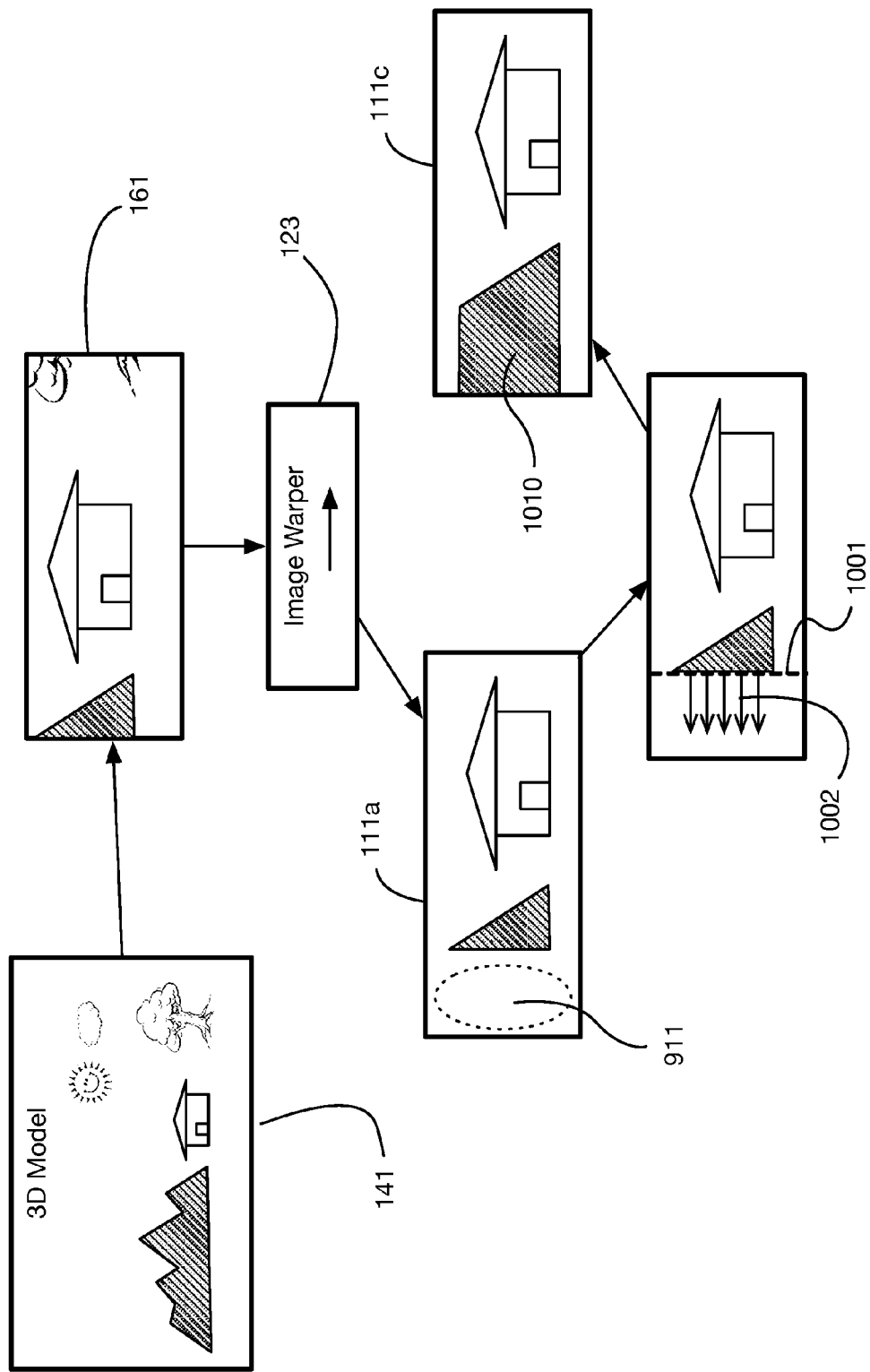
FIG. 10 illustrates an embodiment of the system that fills holes generated by low-latency rerendering transformations by extending pixels from the image boundary.

One potential drawback of the strategy of generated an extended rendered area is that it requires additional processing for the rendering of more pixels; thus it may exacerbate latency issues due to rendering delays. One or more embodiments may employ a hole-filling strategy that instead generates pixel values for the missing pixels based on some features of the warped image. For example, the embodiment of the system illustrated in FIG. 10 fills in pixel values by propagating pixels outward from the boundaries of the warped image into the regions with holes. For illustration, image warper 123 shifts pixels of 2D projection 161 to the right, resulting in hole 911 that is missing pixels. In this embodiment, the image warper finds the boundary 1001 that corresponds to the original left edge of projection 161; it then propagates pixel values from this boundary to the left with propagation 1002. This pixel propagation results in filled region 1010 rather than the hole 911. In this illustrative embodiment, the resulting image 111c has no noticeable hole; however the resulting shape of the mountainous area does not correspond precisely to the shape in the original 3D scene model 141. Nevertheless this simple strategy of propagating pixels from the boundary may provide adequate realism in some applications. One or more embodiments may employ other strategies to approximate pixel values in holes; for example one or more embodiments may locate a series of pixels in the warped image that are relatively close to the location of a missing pixel, and interpolate these pixel values to fill the hole.

Figure 11:
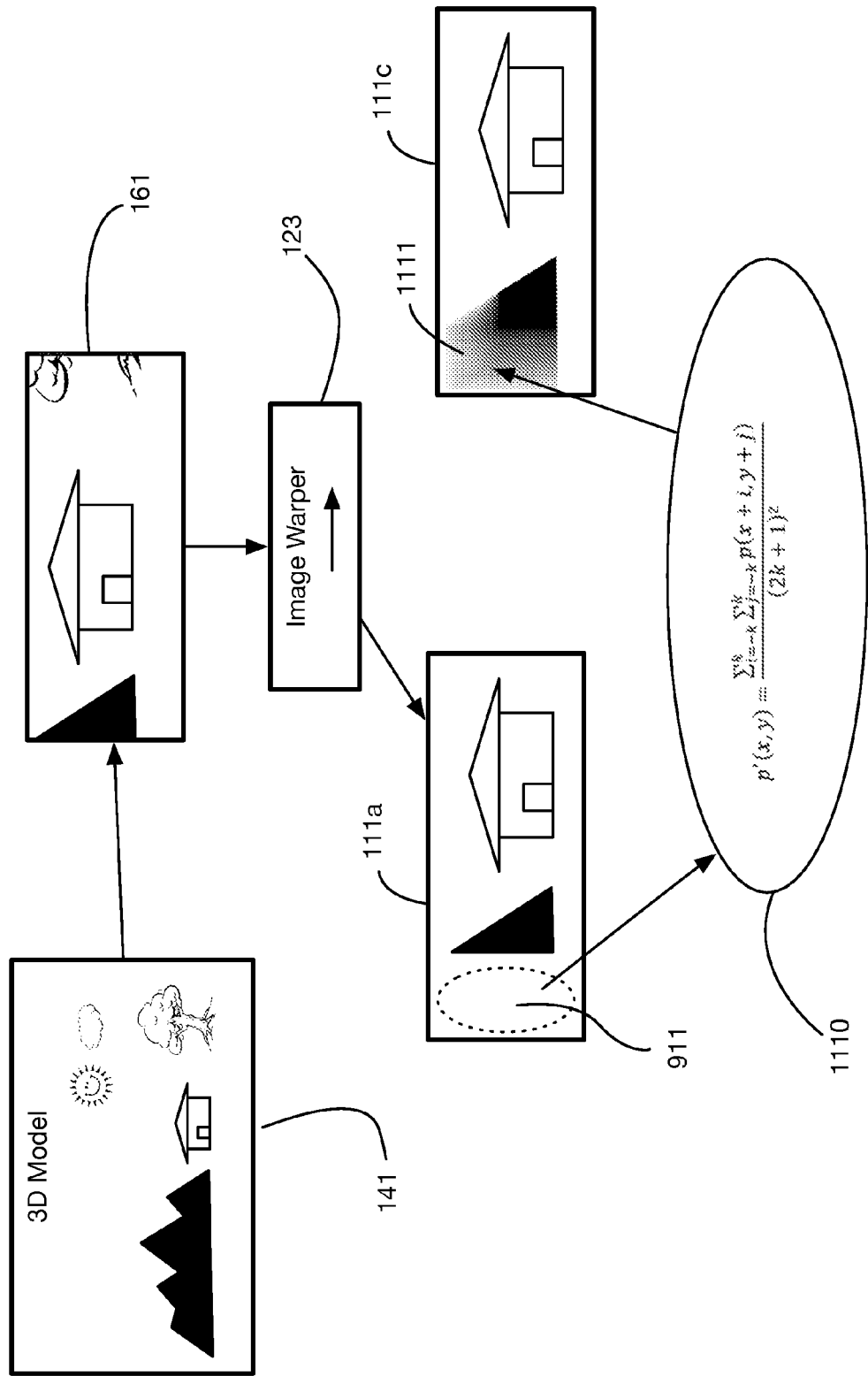
FIG. 11 illustrates an embodiment of the system that fills holes generated by low-latency rerendering transformations by blurring pixels near the image boundary.

Because pixel-filling approaches that propagate pixels from boundaries (or use similar heuristics) result in regions on the edges of displays that are not entirely faithful to the original 3D scene model, one or more embodiments may employ various blurring approaches to make these regions appear less sharp. By blurring the filled in regions, the approximate pixel values may be less noticeable to the viewer. FIG. 11 illustrates an embodiment that utilizes such a blurring. As before, the image warper shifts pixels to the right, resulting in hole 911 in warped image 111a. Then blurring transformation 1110 is applied to the pixels in hole 911. The illustrative blurring transform 1110 simply averages pixel values across a square region center centered at the coordinates of each missing pixel. The resulting blurred region 1111 in 111c has no obvious hole with missing pixel values; moreover the blurring has no obvious artifacts like the flat mountaintop showing in FIG. 10, region 1010. The blurring transformation 1110 which averages values in a local neighborhood is simply illustrative; embodiments may employ any desired transformation on the pixels of regions with holes, or on any pixels near to these regions, to achieve a desired blurring effect. For example, instead of a simple averaging, a Gaussian blur filter may be employed by one or more embodiments.

Figure 12:
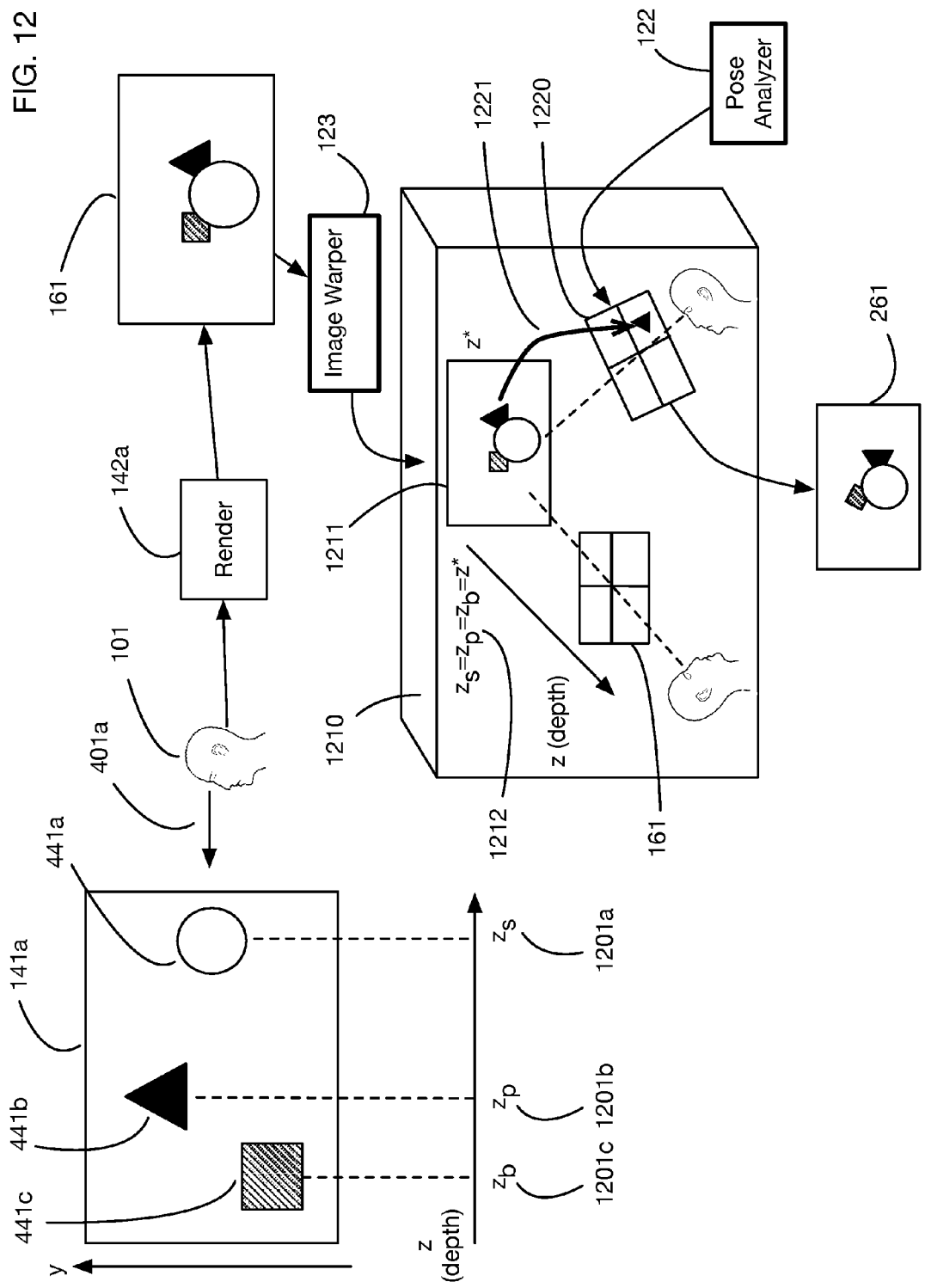
FIG. 12 illustrates an embodiment of the system that generates a low-latency rerendering transformation by projecting the rendered image onto a plane, and then rerendering onto a modified image plane corresponding the user's modified pose.

We now discuss illustrative approaches for image warping transformations. These transformations are rerendering approximations, rather than full rendering from the 3D scene model. In one or more embodiments, a rerendering approximation is generated by first creating a simplified 3D model from the 2D projections, and then reprojecting this simplified 3D model onto new view planes based on user's modified pose. For example, a simplified 3D model may be formed by mapping the 2D projections generated by the renderer onto one or more surfaces in 3D space. FIG. 12 illustrates an embodiment of the system that uses this approach for approximate rerendering. 3D scene model 141a consists of three objects: a sphere 441a close to user 101, a pyramid 441b further from the user, and a box 441c furthest from the user. FIG. 12 shows a two-dimension projection of the 3D scene model onto the y-z plane; here the z-axis points towards the user and the user is located at z=0 (a convention often used in 3D graphics applications), the y-axis points upwards, and the x-axis points towards the user's right. The sphere is at distance $z_s$ from the user; the pyramid is at distance $z_p$ from the user; and the box is at distance $z_b$ from the user. (These z-values are negative, in conformance with the orientation of the z-axis.) Scene renderer 142a generates 2D projection 161 of the 3D model. User 101 then changes pose, and image warper 123 performs a rerendering approximation to generate modified image 261. The rendering approximation first projects the 2D projection 161 onto plane 1211 in simplified 3D model 1210; this plane 1211 is at distance z* from the user. The value z* may be fixed, or it may be provided by the scene renderer 142a based on an average or typical distance of objects in the 3D model 141a from the user. In the simplified 3D model 1210 used by the image warper, all objects appear in 3D space at the same depth z* from the user, because all objects have been projected onto the single plane 1211 with depths 1212 of $z_s=z_p=z_b=z^*$. This does not match the actual depths 1201a, 1201b, and 1201c in the original 3D scene model 141a; hence the image warper is employing an approximate rerendering for efficiency, which simplifies the 3D rerendering model 1210 compared to the real 3D scene model 141a.

From the plane 1211 at depth z*, the image warper reprojects pixels onto modified view plane 1220 corresponding to the user's new pose. The orientation of plane 1220 is based on data received from pose analyzer 122. This reprojection generates modified image 261. In the illustrative example shown in FIG. 12, view plane 1220 is rotated clockwise compared to the initial view plane for image 161; hence the objects in 261 are rotated counterclockwise to form the rerendering approximation.

The embodiment illustrated in FIG. 12 generates a rerendering approximation by mapping the original 2D projection onto a single plane parallel to the user's original view plane, and then reprojecting that plane onto the user's modified view plane. One or more embodiments may map 2D projections onto other surfaces to perform approximate rerendering. For example, some embodiments may multiple portions of the 2D projections onto multiple planes. One or more embodiments may map 2D projections onto one or more curved surfaces, such as for example a sphere or a cylinder.

Mathematically, one or more embodiments may implement the rerendering approximation illustrated in FIG. 12 as follows. This implementation is illustrative only; embodiments may employ any desired transformations, algorithms, mappings, or image warpings to perform rerendering approximations. We assume for ease of illustration that a 2D projection is a rectangular image w pixels wide and h pixels high, and that the width w represents a horizontal field of view of f radians. We assume that the 2D projection was generated using a perspective projection transform of the 3D scene model onto view plane z=−1, followed by a scaling from spatial coordinates to pixel coordinates of s=w/2 tan f/2. The view plane z=−1 is mapped onto plane z=−z* to form the 3D model for rerendering; thus point (x, y) of the view plane is mapped to coordinates (z*x, z*y, −z*). The subsequent change to the user's pose is modeled as a rigid body transformation T of the view plane, which in general consists of a rotation R of angle Δθ around unit vector axis $\hat{\omega}$ followed by a translation by vector Δr. Each point (z*x, z*y, −z*) is then projected onto this new view plane, and rescaled from spatial coordinates to pixel coordinates by the same scaling factor of $$s = w/2\tan\frac{f}{2},$$

to generate the rerendering approximation.

Derivation of the projection onto the new view plane may be simplified by recognizing that transforming the view plane by transformation T is equivalent to transforming the points on the plane z=−z* by $T^{-1}$, and then mapping these points to the original view plane z=−1. Mapping points to the view plane z=−1 is straightforward: point (x, y, z) maps to $$\left(-\frac{x}{z}, -\frac{y}{z}, -1\right).$$

Thus the rerendering approximation includes the following steps:

$$(x, y) \rightarrow (z^*x, z^*y, -z^*) =$$
$$(x_0, y_0, z_0) \rightarrow T^{-1}(x_0, y_0, z_0) = (x_1, y_1, z_1) \rightarrow \left(-\frac{x_1}{z_1}, -\frac{y_1}{z_1}\right) = (x', y')$$

Mapping $T^{-1}$ consists of a translation by vector $-\Delta r$ followed by a rotation R of angle $\Delta\theta$ around unit vector axis $\hat{\omega}$. We now consider the case of small changes in the user's pose, where both $\Delta r$ and $\Delta\theta$ are small. In this case, rotation R can be approximated as $R \approx I + S(\hat{\omega})\Delta\theta$, where S is the cross-product matrix ($S(u)v = u \times v$), and I is the identity matrix. For small changes, the effects of translation and rotation are approximately additive; thus $T^{-1}r \approx r - \Delta r - (\hat{\omega} \times r)\Delta\theta$. Letting $\Delta r = (\Delta r_x, \Delta r_y, \Delta r_z)$ and $\hat{\omega} = (\omega_x, \omega_y, \omega_z)$ we have $T^{-1}(x_0, y_0, z_0) = (x_0 - \Delta r_x - \omega_y z_0 \Delta\theta + \omega_z y_0 \Delta\theta, y_0 - \Delta r_y + \omega_x z_0 \Delta\theta - \omega_z x_0 \Delta\theta, z_0 - \Delta\theta, z_0 - \Delta r_z - \omega_x y_0 \Delta\theta + \omega_y x_0 \Delta\theta)$. Thus $$x' = -\frac{x_0 - \Delta r_x - \omega_y z_0 \Delta\theta + \omega_z y_0 \Delta\theta}{z_0 - \Delta r_z - \omega_x y_0 \Delta\theta + \omega_y x_0 \Delta\theta} =$$

$$-\frac{z^*x - \Delta r_x + \omega_y z^* \Delta\theta + \omega_z z^* y \Delta\theta}{-z^* - \Delta r_z - \omega_x z^* y \Delta\theta + \omega_y z^* x \Delta\theta} = \frac{x - \frac{\Delta r_x}{z^*} + \omega_y \Delta\theta + \omega_z y \Delta\theta}{1 + \frac{\Delta r_z}{z^*} + \omega_x y \Delta\theta - \omega_y x \Delta\theta}$$

and $$y' = -\frac{y_0 - \Delta r_y + \omega_x z_0 \Delta\theta - \omega_z x_0 \Delta\theta}{z_0 - \Delta r_z - \omega_x y_0 \Delta\theta + \omega_y x_0 \Delta\theta} =$$

$$-\frac{z^*y - \Delta r_y - \omega_x z^* \Delta\theta - \omega_z z^* x \Delta\theta}{-z^* - \Delta r_z - \omega_x z^* y \Delta\theta + \omega_y z^* x \Delta\theta} = \frac{y - \frac{\Delta r_y}{z^*} - \omega_x \Delta\theta - \omega_z x \Delta\theta}{1 + \frac{\Delta r_z}{z^*} + \omega_x y \Delta\theta - \omega_y x \Delta\theta}$$

These expressions can be further simplified for the case of small x and y, which corresponds to pixels relatively near the center of the original 2D projection. Continuing to assume that both $\Delta r$ and $\Delta\theta$ are small, many of the terms above are second-order expressions, such as for example $y\Delta\theta$. Ignoring these second order terms, we have approximately:

$$x' \approx \frac{x - \frac{\Delta r_x}{z^*} + \omega_y \Delta\theta}{1 + \frac{\Delta r_z}{z^*}}$$

$$y' \approx \frac{y - \frac{\Delta r_y}{z^*} - \omega_x \Delta\theta}{1 + \frac{\Delta r_z}{z^*}}$$

Furthermore for small $\Delta r$ the denominator can be ignored to first order, since $$\frac{1}{1 + \Delta r_z / z^*} \approx 1 - \Delta r_z / z^*,$$

and the product of $\Delta r_z / z^*$ with the terms in the numerators consists of second order terms. Thus we can use the rerendering approximation:

$$x' \approx x - \frac{\Delta r_x}{z^*} + \omega_y \Delta\theta$$

$$y' \approx y - \frac{\Delta r_y}{z^*} - \omega_x \Delta\theta$$

Using this approximation, all coordinates (x, y) are therefore shifted uniformly by translation $$(\Delta x, \Delta y) = \left(-\frac{\Delta r_x}{z^*} + \omega_y \Delta\theta, -\frac{\Delta r_y}{z^*} - \omega_x \Delta\theta\right).$$

This formula provides the coordinate translation in spatial coordinates of the simplified 3D model. To convert to pixel coordinates, we simply apply the scaling factor $$s = w / 2\tan\frac{f}{2}.$$

This yields the pixel translation vector $(s\Delta x, s\Delta y)$.

This derivation shows that an approximate rerendering can be performed using a simple pixel translation vector which is based on a simplified 3D model, and which is a good approximation for small pose changes and for pixels near the center of a display. The derivation shown considers both rotational pose changes and translational pose changes. One or more embodiments may consider only rotational pose changes. These embodiments may for example use a pixel translation vector of $(s\Delta x, s\Delta y) = (s\omega_y \Delta\theta, -s\omega_x \Delta\theta)$, which uses only the rotational components of the pixel translation vector. One or more embodiments may consider only translational pose changes. These embodiments may for example use a pixel translation vector of $$(s\Delta x, s\Delta y) = \left(-\frac{s\Delta r_x}{z^*}, -\frac{s\Delta r_y}{z^*}\right),$$

which uses only the translational components of the pixel translation vector. One or more embodiments may consider both rotational pose changes and translational pose changes. These embodiments may for example use the complete pixel translation vector derived above of $$(s\Delta x, s\Delta y) = \left(-\frac{s\Delta r_x}{z^*} + s\omega_y \Delta\theta, -s\omega_x \Delta\theta - \frac{s\Delta r_y}{z^*}\right).$$

The pixel translation vector approximation derived above is only one of many possible approximations to rerendering. One or more embodiments may use other approximations, or use the exact expressions derived above, to perform rerendering approximations.

Figure 13:
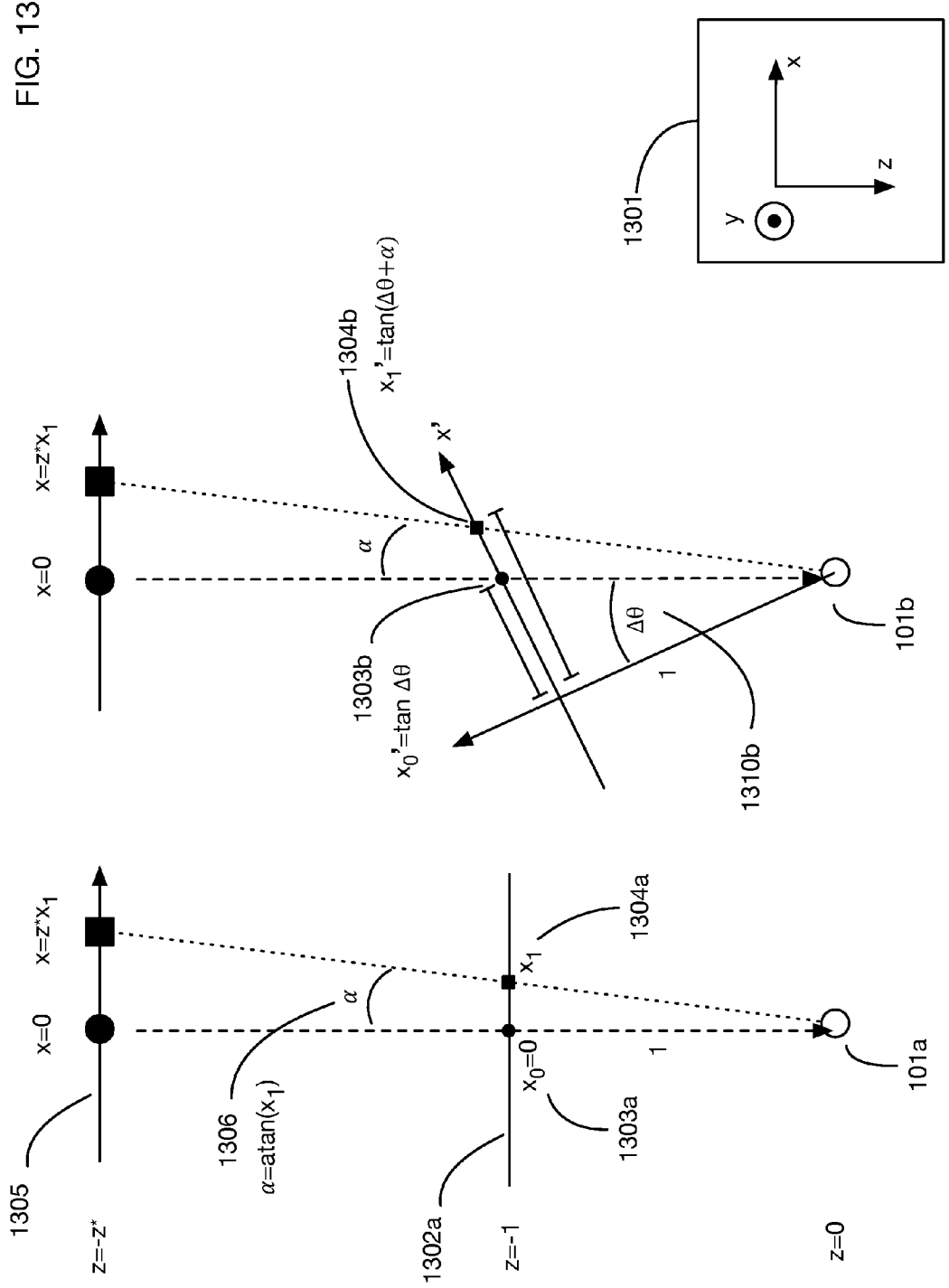
FIG. 13 shows a 2D model of an approximate rerendering calculation that generates a pixel translation vector from small angular rotations of a user's orientation.
Figure 14:
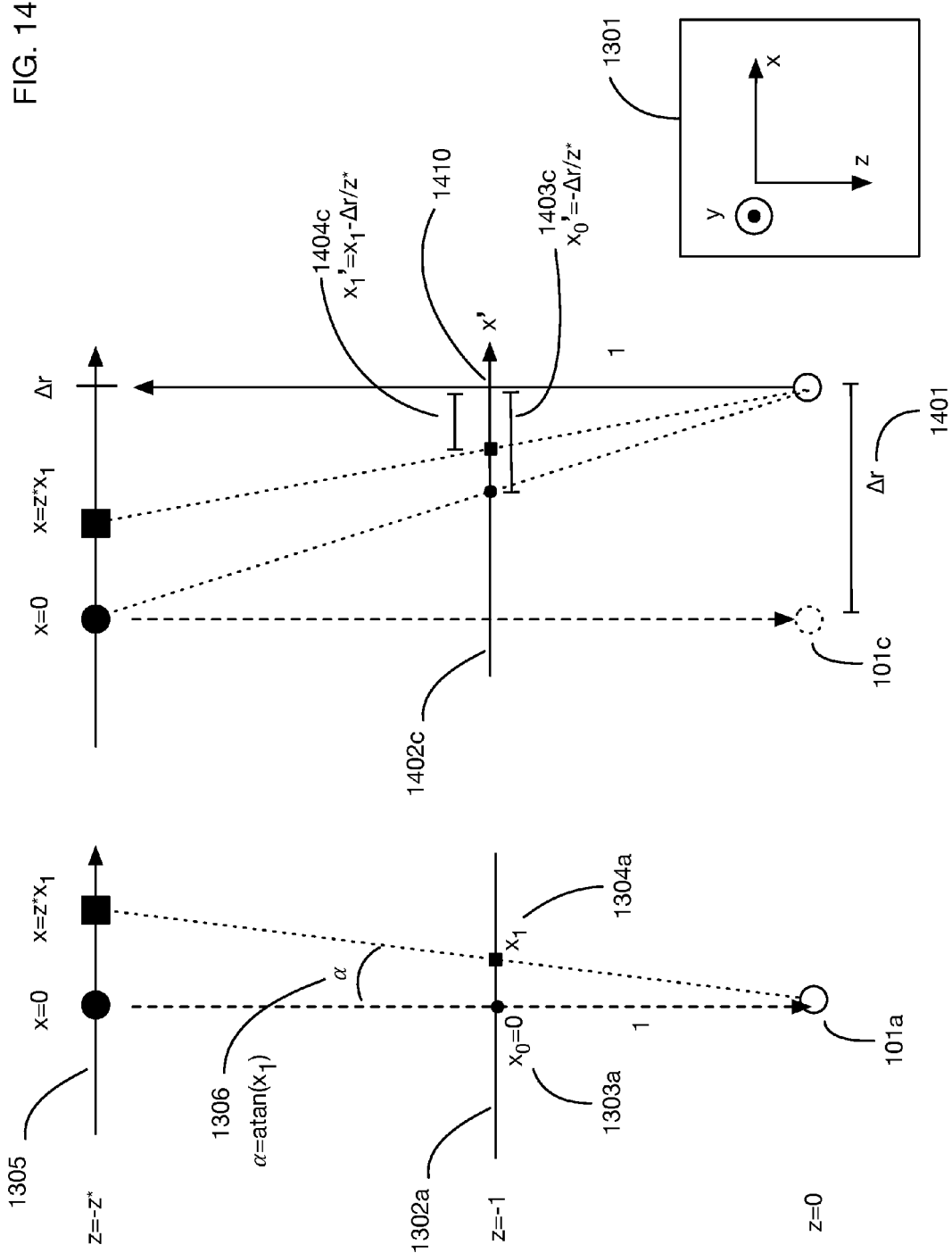
FIG. 14 shows a 2D model of an approximate rerendering calculation that generates a pixel translation vector from translations of a user's position.

Rerendering approximations using the above derived pixel translation vector are illustrated in FIGS. 13 and 14. FIG. 13 illustrates an example of a pose change consisting of a small angular rotation around the y axis. FIG. 13 shows a top view of the transformations, with the coordinate system 1301; the y axis points out of the page. Initially the user has pose 101a, and the 2D projection generated from the 3D scene model has a circle at x-coordinate 1303a (which is 0 since it is at the center of the display), and a square at x coordinate 1304a, which is at angle 1306 ($\alpha$). The rerendering approximation first maps these objects from the view plane 1302a onto plane 1305, located at distance z* from the user. The user then changes pose to 101b, by rotating the view vector clockwise around the y axis by angle $\Delta\theta$. The objects on plane 1305 are then reprojected on the new view plane. The circle, which was originally at $x_0$=0, has new x coordinate 1303b in the new view plane, with value $x_0'$=tan $\Delta\theta$. Since we presume that $\Delta\theta$ is small, tan $\Delta\theta \approx \Delta\theta$. The square which was originally at $x_1$ has new x coordinate 1304b in the new view plane, with value $x_1'$=tan($\Delta\theta$+$\alpha$). If both $\Delta\theta$ and $\alpha$ are small, then tan($\Delta\theta$+$\alpha$)$\approx$tan $\Delta\theta$+tan $\alpha \approx \Delta\theta + x_1$. Thus both points $x_0$ and $x_1$ are shifted approximately by amount $\Delta\theta$. This result corresponds to the pixel translation vector formula derived above, with $\omega_y$=1, $\omega_x$=$\Delta r_x$=$\Delta r_y$=0.

FIG. 14 illustrates an example of a pose change consisting of a small translation along the x-axis by amount $\Delta r$. The initial user pose 101a, 2D projection 1302a, and mapping to plane 1305 are identical to those of FIG. 13. The user then changes pose to 101c, by moving to the right by amount 1401 ($\Delta r$). The view plane also moves to the right, the origin of the new x' axis 1402c perpendicular to the user's new position at point 1410. Objects on plane 1305 are then reprojected on the new view plane. The circle, which was originally at $x_0$=0, has new x coordinate 1403c in the new view plane, with value $x_0'$=$-\Delta r/z^*$. The square which was originally at $x_1$ has new x coordinate 1404c in the new view plane, with value $x_1'$=$x_1 - \Delta r/z^*$. This result corresponds to the pixel translation vector formula derived above, with $\Delta r_x$=$\Delta r$, $\omega_x$=$\omega_y$=$\Delta r_y$=0.

One or more embodiments of the invention may generate an efficient estimate of the orientation of an object, using data from a magnetic sensor, and angular rate sensor, and a gravity sensor. The object may be any object for which an orientation estimate is desired. For example, without limitation, the object may be a virtual reality headset or other virtual reality device, a person or part of a person, a vehicle, a drone, a robot, a tool, or an instrument.

Figure 15:
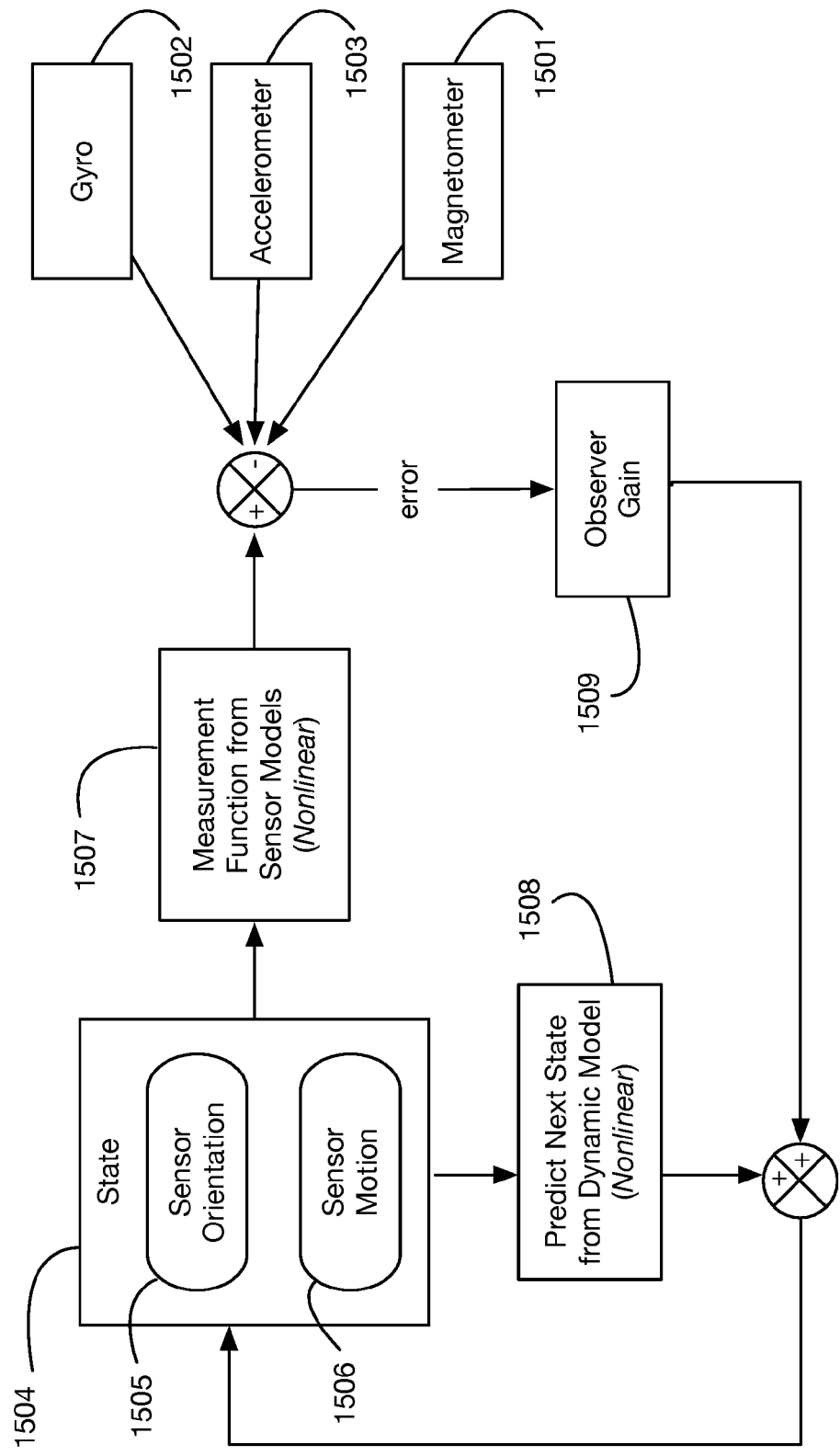
FIG. 15 shows prior art for estimating orientation using a Kalman filter.
Figure 16:
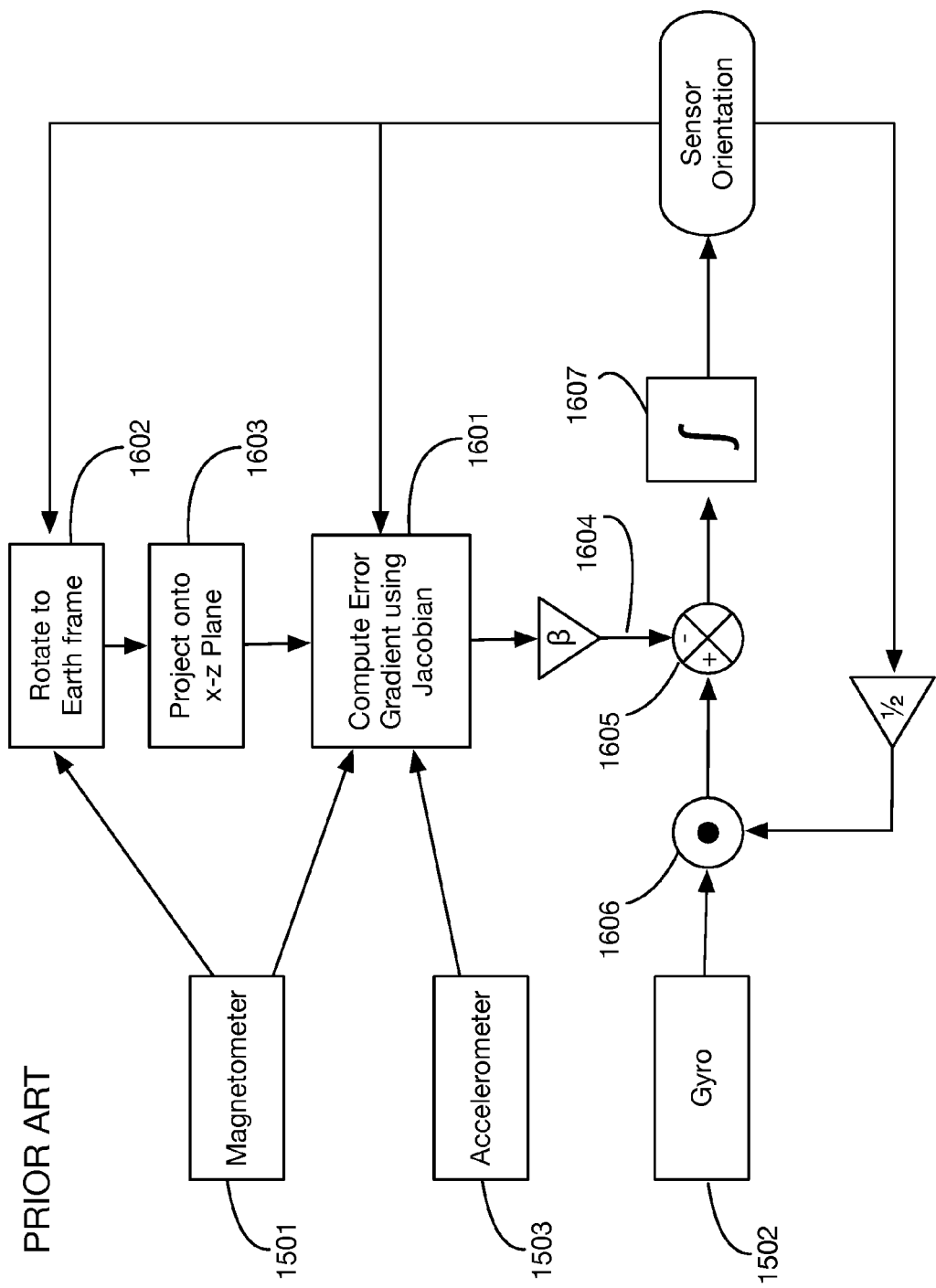
FIG. 16 shows prior art for estimating orientation using a gradient descent optimization.

FIGS. 15 and 16 illustrate typical orientation estimation algorithms available in the prior art. These illustrated algorithms use data from magnetic, angular rate, and gravity sensors (known as "MARG" sensors in the art). For example, magnetic data may be provided by a magnetometer 1501. Angular rate data may be provided by a rate gyroscope 1502. Gravity data may be provided by an accelerometer 1503. (Accelerometer data may also be affected by acceleration of the object.)

FIG. 15 illustrates a common approach to orientation estimation using a Kalman filter. Kalman filters and modifications thereto, such as extended Kalman filters, are known in the art, and they have been applied to orientation estimation. See for example: J. Marins et. al., "An Extended Kalman Filter for Quaternion-Based Orientation Estimation Using MARG Sensors", *Proceedings of the* 2001 *IEEE/RJS International Conference on Intelligent Robots and Systems*. Kalman filters are often complex to implement and computationally intensive and inefficient. There are several potential sources of complexity and inefficiency with Kalman Filters. The state vector 1504 often must be expanded beyond the sensor orientation 1505, to include several variables 1506 that track aspects of the sensor motion; these additional variables are needed for state prediction and for models of state dynamics. The measurement function 1507 that predicts sensor measurements from state variables is complex and highly nonlinear for orientation estimation filters. The state prediction function 1508 is also highly nonlinear, and it requires a model of the dynamics of the system. The observer gain matrix 1509 requires error covariance estimates for both process noise and measurement noise. This matrix is also typically updated on each iteration, using a series of matrix multiplications.

FIG. 16 illustrates an approach to orientation estimation described in S. O. H. Madgwick, "An efficient orientation filter for inertial and inertial/magnetic sensor arrays", Technical report, University of Bristol University, UK, (2010). This approach does not use a Kalman filter; instead it uses gradient descent to drive the sensor orientation to a value that eventually minimizes gravity and magnetic errors. The computation 1601 of the gradient of the error function involves a complex matrix product involving the Jacobian of the error function. In addition, the magnetometer reading must first be rotated 1602 into the Earth frame, and then projected 1603 onto the x-z plane; these steps are necessary because the error is calculated in the Earth reference frame rather than the sensor reference frame. While the method of Madgwick is potentially less complex than a Kalman filter, it nevertheless requires several complex calculations for each iteration.

Figure 17:
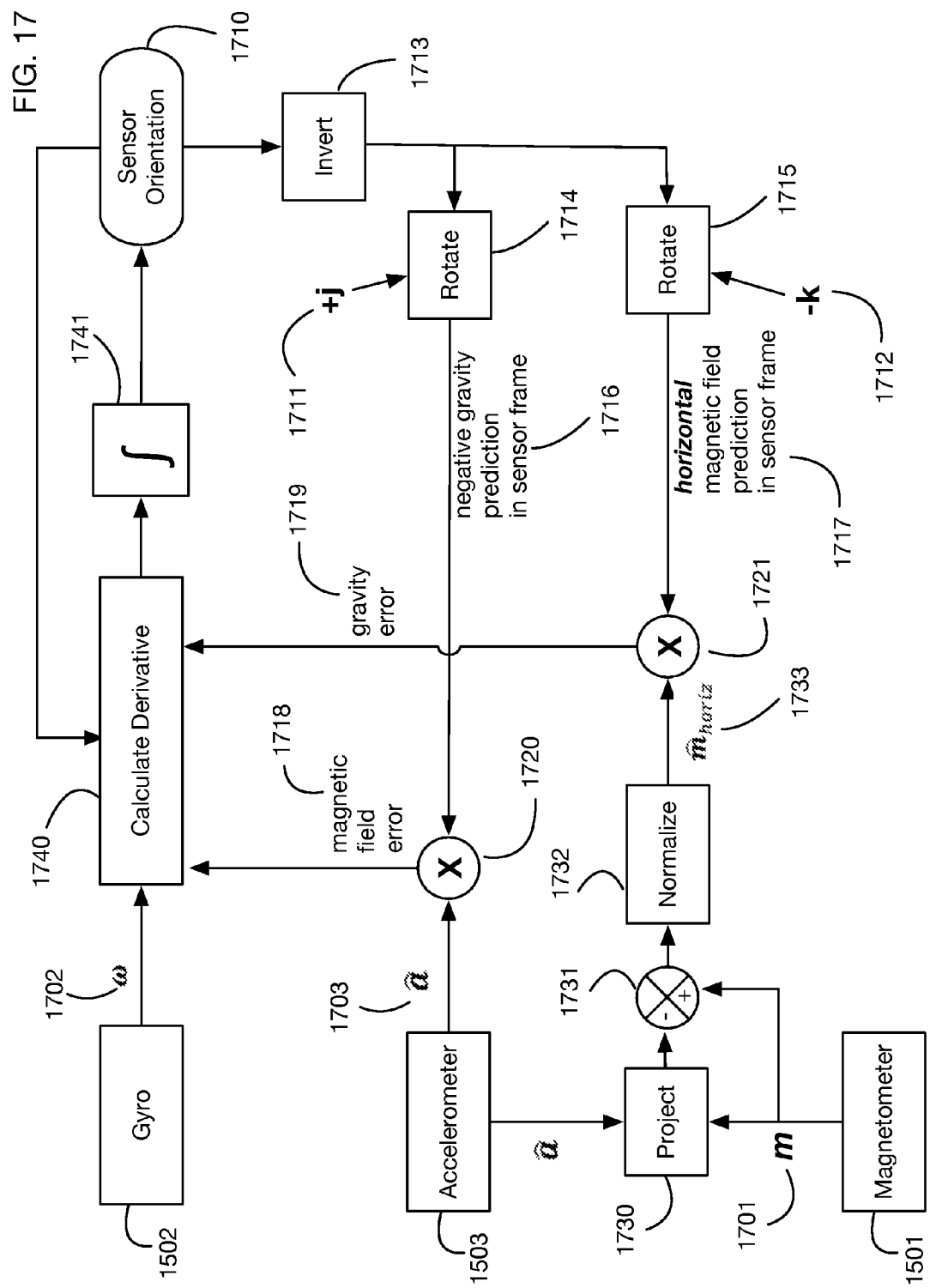
FIG. 17 shows a block diagram of an orientation estimation algorithm used in one or more embodiments of the invention; the algorithm integrates an orientation derivative that combines an angular velocity measurement with errors between measured and predicted gravitational and magnetic field vectors.

FIG. 17 shows a block diagram of an efficient orientation estimation algorithm used in one or more embodiments of the invention. The embodiment includes at least three sensors: a rate gyroscope 1502 that generates an angular velocity vector 1702 $\omega$; an accelerometer 1503 that generates an acceleration vector a, which is normalized to a normalized acceleration 1703 â; and a magnetometer 1501 that generates a magnetic field vector 1701 m. In one or more embodiments the sensors 1501, 1502, and 1503 may be three-axis sensors. In one or more embodiments the sensors may have any number of axes. The sensors may provide sensor data in a sensor reference frame. In one or more embodiments, if the reference frames of the individual sensors do not coincide, a preprocessing step may be used to convert all sensor data to a common sensor reference frame.

The sensors 1501, 1502, and 1503 are illustrative; one or more embodiments may use any types of sensors that provide angular rotation information and that provide gravity and magnetic field information.

In one or more embodiments the sensors may be attached to, mounted to, coupled to, or integrated into an object for which the orientation is desired. Typically, the orientation of the object is desired relative to a fixed reference frame, which we call the Earth reference frame. Since the sensors are presumed to be attached to the object, the object orientation is determined by the sensors' orientation relative to the Earth reference frame. As is known in the art, the sensor orientation relative to the Earth reference frame may be represented by an orientation rotation that rotates any vector in the sensor reference frame into a corresponding vector in the Earth reference frame.

As is known in the art, in the absence of any errors or drift the angular velocity 1702 may be integrated to derive the sensor orientation over time. However, because of inevitable errors and drift, correction of the sensor orientation using additional sensors is needed. In FIG. 16, this correction 1605 is provided using gradient descent. In the embodiment illustrated in FIG. 17, a simpler, more efficient direct calculation is made to generate a correction. The Earth reference frame is selected so that the gravity vector and the horizontal component of the magnetic field vector lie on orthogonal axes. Aligning the Earth reference frame with gravity and with the horizontal magnetic field provides for a simple calculation of the predicted accelerometer and magnetometer measurements 1716 and 1717. Specifically we denote the Earth's reference axes as unit vectors î, ĵ, k̂, with ĵ pointing vertically upwards (opposite the gravity vector), and $\hat{k}$ pointing opposite the horizontal magnetic field ($\hat{k}$ points towards "magnetic south"). This notation and choice of axes are illustrative; one or more embodiments may assign any desired reference axes to the Earth reference frame. The expected accelerometer reading in the Earth reference frame should therefore be 1711 $+\hat{j}$ (since an accelerometer measures the negative of gravity) and the expected horizontal magnetic field reading in the Earth reference frame should therefore be 1712 $-\hat{k}$. To compare these values to the actual sensor readings, the reference values 1711 and 1712 are translated to the sensor reference frame. Sensor orientation 1710 is inverted 1713 to form an Earth to sensor rotation. This rotation 1714 is applied to 1711 to form the negative gravity prediction 1716 in the sensor frame. A rotation 1715 is applied to 1712 to form the horizontal magnetic field prediction 1717 in the sensor frame.

Because these predictions 1716 and 1717 are in the sensor frame, they can be compared directly with the readings from the sensors. This represents a simplification over the algorithm of FIG. 16, which calculates gravity and magnetic field estimates in the Earth reference frame. Thus in FIG. 16 rotation 1602 transforms the reading from magnetometer 1501 into the Earth reference frame; this transformed magnetic field is projected 1603 onto the x-z plane and is input into the gradient calculation 1601. The gradient calculation 1601 also rotates the acceleration reading from accelerometer 1503 into the Earth reference frame. The resulting scaled gradient 1604 is added to the angular velocity rotated into the Earth reference frame by multiplication 1606, and the sum is integrated. In contrast, the algorithm of FIG. 17 calculates magnetic field error 1718 and gravity error 1719 in the sensor reference frame. A preliminary projection 1730 is performed to obtain the vertical component of the magnetic field reading 1701; since the acceleration 1703 points in the vertical direction (as viewed in the sensor reference frame), this projection is done by projecting 1701 onto 1703. This projection is subtracted 1731 from 1701, and the difference is normalized 1732, to form the horizontal magnetic field 1733 $\hat{m}_{horiz}$. In contrast to the algorithm of FIG. 16, calculating the horizontal magnetic field is done without requiring a rotation. Errors 1718 and 1719 are calculated using vector cross products 1720 and 1721, respectively. The cross product magnitudes reflect the angular differences between the predicted values (1716 and 1717) and the sensor readings (1703 and 1733). The direction of the cross product is the axis of rotation that will rotate one vector into another. Thus the cross product error terms provide a rotational correction term that can be included directly in the orientation derivative.

The algorithm of FIG. 17 performs a calculate derivative step 1740 to obtain a derivative of the sensor orientation, and it then integrates 1741 this derivative to update the sensor orientation 1710. In one or more embodiments an initial sensor orientation may be provided or estimated to begin the integration process. One or more embodiments may use any integration techniques, including for example, without limitation, symbolic integration or numerical integration. One or more embodiments may use numerical integration methods using any step size or numerical techniques. The process shown in FIG. 17 may be iterative; at each cycle where new sensor data is available, the integration loop may be repeated to form a new sensor orientation 1710.

One or more embodiments may use any method to perform the calculate derivative step 1740. Inputs to the derivative calculation may include for example the angular velocity 1702, the magnetic field error 1718, the gravity error 1719, and the previous sensor orientation 1710. One or more embodiments may combine these factors in any manner to form a derivative of the sensor orientation. One or more embodiments may use any representation for sensor orientation, including for example any of the representations for rotations known in the art. These representations may include for example, without limitation, quaternions, rotation matrices, Euler angles, Cardan angles, or axis angle representation.

Figure 18:
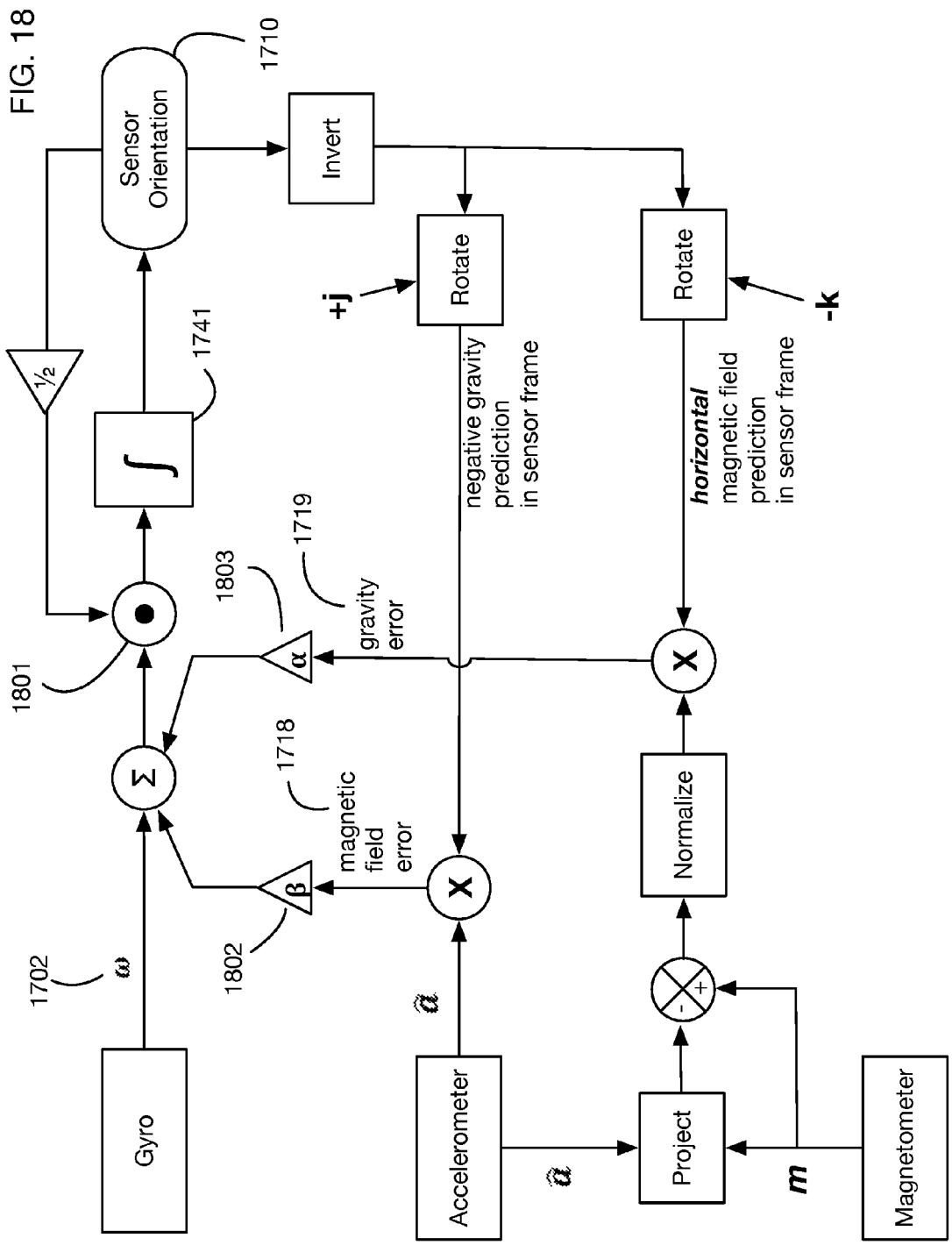
FIG. 18 shows a block diagram of an orientation estimation algorithm that adds scaled magnetic and gravitational field errors to the angular velocity.

In one or more embodiments, the sensor orientation may be represented as a unit quaternion. As is known in the art, the time derivative of unit quaternion q(t) representing the sensor orientation over time is $$\frac{dq}{dt} = \frac{1}{2}q\omega,$$

where $\omega$ is the angular velocity measured by the sensor (in the sensor reference frame). FIG. 18 illustrates an embodiment of the invention that uses a unit quaternion to represent the sensor orientation 1710. In this embodiment, the scaling factor ½ is applied to sensor orientation 1710, which is multiplied 1801 by angular velocity 1702 (along with error terms), to form the derivative that is integrated 1741. In this illustrative embodiment, the orientation derivative is a sum of the angular velocity 1702 and error vectors 1718 and 1719 weighted by scaling factors 1802 and 1803, respectively. This is a particular embodiment of the general approach illustrated in FIG. 17, which performs the calculate derivative step 1740 by combining the angular velocity with the gravity and magnetic field errors in any desired manner. The embodiment illustrated in FIG. 18 may be viewed as a proportional feedback control system, with proportional factors 1802 and 1803 applied to errors 1718 and 1719. In one or more embodiments these factors 1802 and 1803 may be set to any desired values. The factors 1802 and 1803 may be fixed or variable. In one or more embodiments one or both of the factors 1802 and 1803 may be set to zero.

Figure 19:
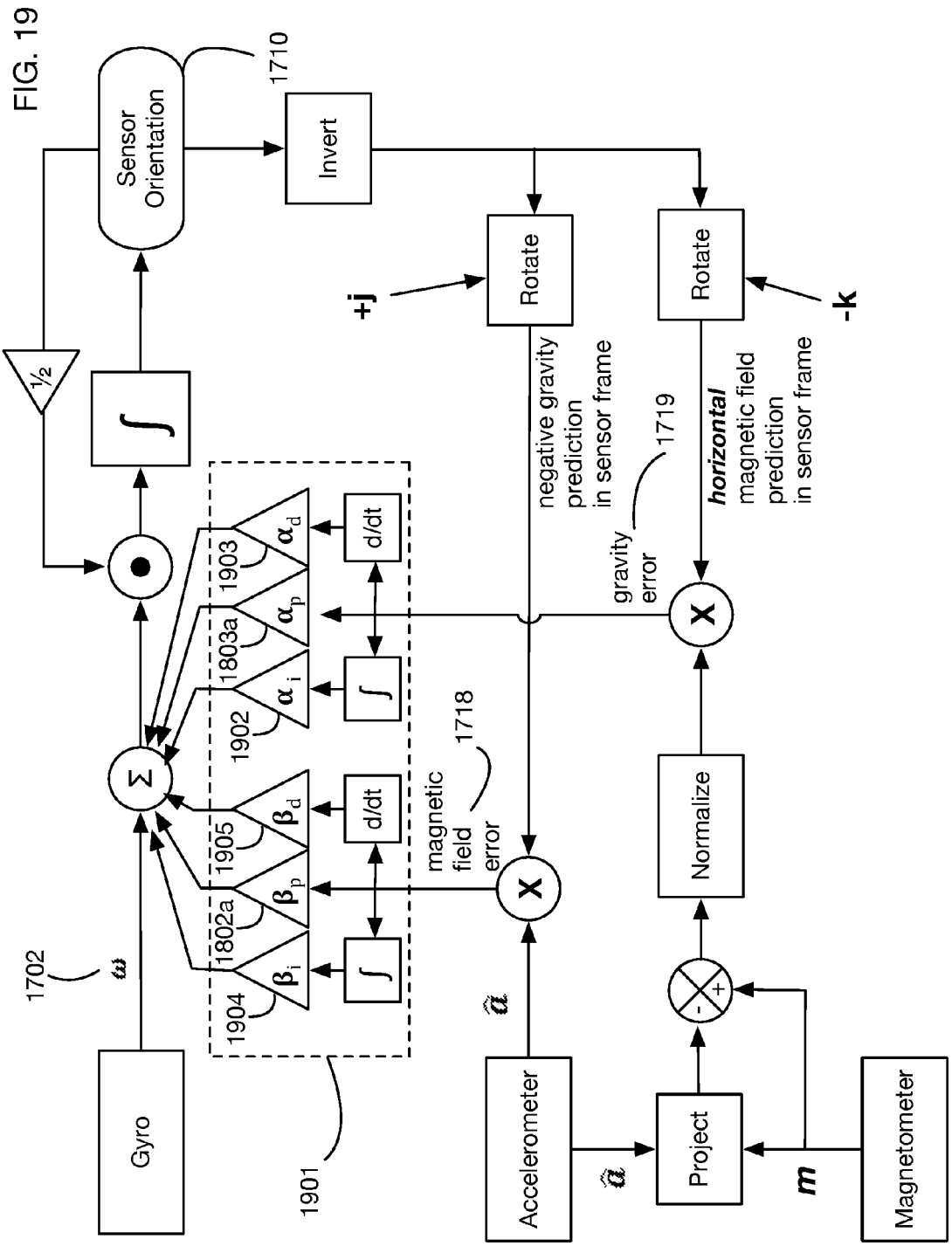
FIG. 19 shows a generalization of the algorithm of FIG. 18, which adds integral and derivative error terms to the proportional error terms of FIG. 18.

FIG. 19 illustrates an embodiment of the invention that uses a generalization of the algorithm shown in FIG. 18. The embodiment of FIG. 19 uses a PID (proportional, integral, derivative) feedback control loop, as compared to the proportional control of FIG. 18. PID controllers are known in the art; one or more embodiments may apply any of the known PID techniques to design, implement, and tune a PID feedback loop. Control block 1901 calculates multiple scaled error components that are added to the angular velocity 1702. For example, scaling factor 1803*a* (the proportional factor $\alpha_p$) is applied directly to the gravity error vector 1719; scaling factor 1902 (the integral factor $\alpha_i$) is applied to the cumulative integral or cumulative sum of error vector 1719; and scaling factor 1903 (the derivative factor $\alpha_d$) is applied to the derivative or the difference of gravity error vector 1719. Similar factors 1802*a*, 1904, and 1905 ($\beta_p$, $\beta_i$, and $\beta_d$) are applied to the magnetic field error vector 1718. In one or more embodiments any or all of the factors 1904, 1802*a*, 1905, 1902, 1803*a*, and 1903 may be constant or they may vary over time. In one or more embodiments any or all of the factors 1904, 1802*a*, 1905, 1902, 1803*a*, and 1903 may be zero. In particular, in one or more embodiments the derivative factors 1905 and 1903 may be zero, which generates a PI controller. In one or more embodiments the integral factors 1904 and 1902 may be zero, which generates a PD controller. In one or more embodiments the integral and derivative factors 1904, 1905, 1902, and 1903 may be zero, which generates a proportional controller like that of FIG. 18.

Figure 20:
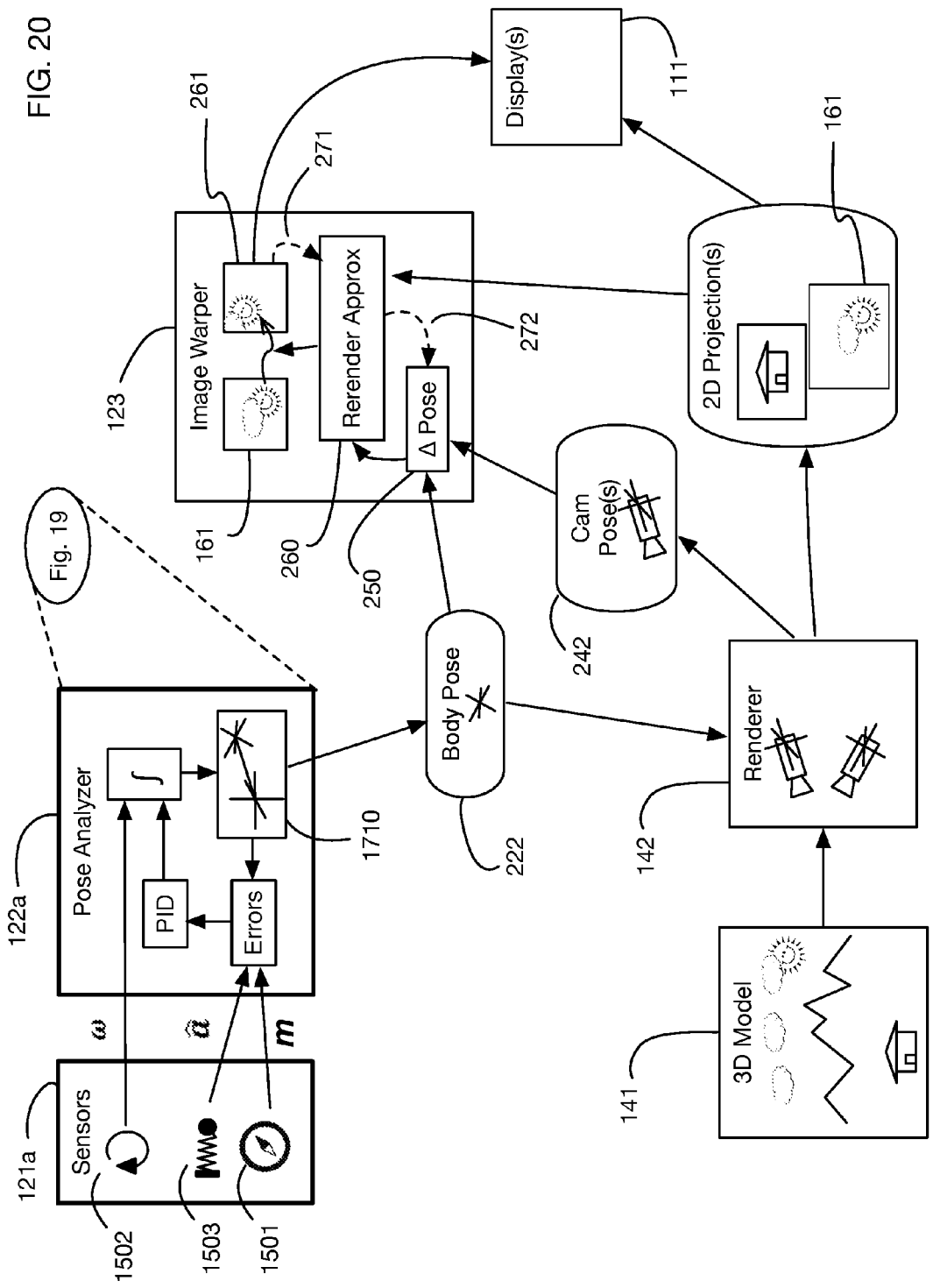
FIG. 20 shows a block diagram of an embodiment that uses the orientation estimation algorithm, as illustrated for example in FIG. 19, to control a virtual reality display system.

One or more embodiments may use any of the systems described above to estimate the orientation of any object. In particular, in one or more embodiments the sensors may measure the angular velocity, acceleration, and magnetic field associated with a virtual reality headset or with a user in a virtual reality environment. One or more embodiments of the system may therefore be used to estimate the orientation of a virtual reality headset, and this orientation may be used by a virtual reality system to generate a virtual reality display. FIG. 20 illustrates an embodiment that applies the efficient orientation estimation techniques described above to a virtual reality device such as the device described in FIG. 2. Sensors 121*a* comprise a rate gyroscope 1502, an accelerometer 1503, and a magnetometer 1501. These sensors may for example be attached to, mounted to, or integrated into a virtual reality headset, or otherwise attached to, mounted to, or worn by a user. Pose analyzer 122*a* implements one or more of the efficient orientation estimation algorithms described above. For example, pose analyzer 122*a* may use a PID controller similar to the controller illustrated in FIG. 19, or any variant thereof. The sensor orientation 1710 calculated by the pose analyzer 122*a* is converted if necessary into body pose 222, which is used by the virtual reality system to generate a virtual reality display. Details of the generation of the virtual reality display are described above.

While the invention herein disclosed has been described by means of specific embodiments and applications thereof, numerous modifications and variations could be made thereto by those skilled in the art without departing from the scope of the invention set forth in the claims.

Illustrative Software Implementation

The following software listing illustrates an example of an orientation estimation algorithm that may be used by one or more embodiments of the invention.

```
// PID parameters (P/I only for this implementation)
#define Kp 1.0f        // proportional gain
#define Ki 0.0f        // integral gain
#define Alpha 1.0f     // Error calculation weight of the
                       // magnetometer versus accelerometer
#define FREQ 757.6f    // sample frequency
#define Cei (Ki / FREQ / 2.f)
#define Cqi (1.f / FREQ / 2.f)
// Local static variables
static float q0= 1.f, q1 = 0.f, q2 = 0.f, q3 = 0.f;
// quaternion elements representing the estimated orientation
static float exInt = 0.f, eyInt = 0.f, ezInt = 0.f;
// scaled integral error
void updateSensorOrientation(float gx, float gy, float gz, float
    ax, float ay, float az, float mx, float my, float mz)
{
  float inv_norm, dot_prod;
  float hx, hy, hz;
  float vx, vy, vz, wx, wy, wz;
  float ex, ey, ez;
  // various auxiliary variables
  float q0q0 = q0*q0;
  float q0q1 = q0*q1;
  float q0q2 = q0*q2;
  float q0q3 = q0*q3;
  float q1q1 = q1*q1;
  float q1q2 = q1*q2;
  float q1q3 = q1*q3;
  float q2q2 = q2*q2;
  float q2q3 = q2*q3;
  float q3q3 = q3*q3;
  // normalize the accelerometer reading
  inv_norm = 1.f / sqrt(ax*ax + ay*ay + az*az);
  ax *= inv_norm;
  ay *= inv_norm;
  az *= inv_norm;
  // Calculate the perpendicular component of magnetic to
  // gravity
  dot_prod = ax * mx + ay * my + az * mz;
  hx = mx - dot_prod * ax;
  hy = my - dot_prod * ay;
  hz = mz - dot_prod * az;
  inv_norm = 1.f / sqrt(hx*hx + hy*hy + hz*hz);
  hx *= inv_norm;
  hy *= inv_norm;
  hz *= inv_norm;
  // estimated direction of gravity and north vector (v and w)
     // Predicted accelerometer (q* x j x q)
  vx = 2.f * (q1q2 + q0q3);
  vy = q0q0 - q1q1 + q2q2 - q3q3;
  vz = 2.f * (q2q3 - q0q1);
     // Predicted horizontal magnetic field (q* x (-k) * q)
  wx = 2.f * (q1q3 - q0q2);
  wy = 2.f * (q0q1 + q2q3);
  wz = q0q0 - q1q1 - q2q2 + q3q3;
  // error is sum of cross product between predicted and
  // measured
  // Magnetic term is weighted relative to gravity term.
  ex = (ay*vz - az*vy) + Alpha * (hy*wz - hz*wy);
  ey = (az*vx - ax*vz) + Alpha * (hz*wx - hx*wz);
  ez = (ax*vy - ay*vx) + Alpha * (hx*wy - hy*wx);
  // integral error scaled integral gain
  exInt += ex*Cei;
  eyInt += ey*Cei;
  ezInt += ez*Cei;
  // adjusted gyroscope measurements
  gx += Kp*ex + exInt;
  gy += Kp*ey + eyInt;
  gz += Kp*ez + ezInt;
  // integrate quaternion rate
  q0 += (-q1*gx - q2*gy - q3*gz) * Cqi;
  q1 += (q0*gx + q2*gz - q3*gy) * Cqi;
  q2 += (q0*gy - q1*gz + q3*gx) * Cqi;
  q3 += (q0*gz + q1*gy - q2*gx) * Cqi;
  // normalise quaternion
  inv_norm = 1.f / sqrt(q0*q0 + q1*q1 + q2*q2 + q3*q3);
  q0 *= inv_norm;
  q1 *= inv_norm;
  q2 *= inv_norm;
  q3 *= inv_norm;
}
```

What is claimed is:

1. An efficient orientation estimation system using magnetic, angular rate, and gravity sensors, comprising:
   a magnetometer configured to be attached to an object, wherein said magnetometer generates magnetic field data;
   a rate gyroscope configured to be attached to said object, wherein said rate gyroscope generates angular velocity data;
   an accelerometer configured to be attached to said object, wherein said accelerometer generates acceleration data; and,
   at least one processor comprising a tangible memory medium, coupled to said accelerometer, to said rate gyroscope, and to said magnetometer, and configured to
   define a sensor orientation as a rotation that rotates a vector in a sensor reference frame into a corresponding vector in an Earth reference frame; and,
   calculate an updated value of said sensor orientation as
      obtain said angular velocity data from said rate gyroscope;
      obtain said acceleration data from said accelerometer;

obtain said magnetic field data from said magnetometer;

calculate a gravity prediction in said sensor reference frame;

calculate a horizontal magnetic field prediction in said sensor reference frame;

decompose said magnetic field data into a vertical magnetic component and a horizontal magnetic component;

calculate a gravity error based on said gravity prediction and said acceleration data;

calculate a magnetic field error based on said horizontal magnetic field prediction and said horizontal magnetic component;

calculate an orientation derivative based on
said angular velocity,
said gravity error, and
said magnetic field error; and, integrate said orientation derivative to form said updated value of said sensor orientation.

2. The system of claim 1, wherein
said sensor orientation is a sensor orientation quaternion having unit length.

3. The system of claim 2, wherein
said calculate an orientation derivative comprises
calculate said orientation derivative as one half of said sensor orientation quaternion multiplied by a sum of
said angular velocity,
said gravity error multiplied by a gravity error proportional gain, and,
said magnetic field error multiplied by a magnetic field proportional gain.

4. The system of claim 2, wherein said calculate an orientation derivative comprises
calculate said orientation derivative as one half of said sensor orientation quaternion multiplied by a sum of
said angular velocity,
said gravity error multiplied by a gravity error proportional gain,
said magnetic field error multiplied by a magnetic field proportional gain,
a cumulative sum of said gravity error multiplied by a gravity error integral gain, and,
a cumulative sum of said magnetic field error multiplied by a magnetic field error integral gain.

5. The system of claim 2, wherein said calculate an orientation derivative comprises
calculate said orientation derivative as one half of said sensor orientation quaternion multiplied by a sum of
said angular velocity,
said gravity error multiplied by a gravity error proportional gain,
said magnetic field error multiplied by a magnetic field proportional gain,
a cumulative sum of said gravity error multiplied by a gravity error integral gain,
a cumulative sum of said magnetic field error multiplied by a magnetic field error integral gain,
a derivative of said gravity error multiplied by a gravity error derivative gain, and,
a derivative of said magnetic field error multiplied by a magnetic field error derivative gain.

6. The system of claim 1, further comprising
at least one display viewable by a user, wherein said object is one or more body parts of said user;
a 3D model of a scene; and, a scene renderer coupled to said at least one display, said at least one processor, and said 3D model, wherein said scene renderer
receives said sensor orientation from said at least one processor;
calculates one or more rendering virtual camera poses, based on said sensor orientation;
calculates one or more 2D projections of said 3D model, based on said one or more rendering virtual camera poses; and,
transmits said one or more 2D projections to said at least one display.

7. The system of claim 6, further comprising
an image warper coupled to said at least one display, said scene renderer, and said at least one processor, wherein said image warper
receives said one or more rendering virtual camera poses from said scene renderer;
receives said sensor orientation from said at least one processor;
calculates a change in pose between said one or more rendering virtual camera poses and said sensor orientation;
generates a rerendering approximation of said one or more 2D projections on said at least one display based on said change in pose; and,
modifies one or more pixels of said at least one display based on said rerendering approximation.

8. The system of claim 7, wherein said rerendering approximation comprises calculating a pixel translation vector; and,
translating one or more pixels of said one or more 2D projections by said pixel translation vector.

9. The system of claim 8, wherein calculating said pixel translation vector comprises
approximating said change in pose as a rotation around a unit vector $\hat{\omega}$ comprising $\hat{\omega}_y$ and $\hat{\omega}_x$ by an angle $\Delta\theta$;
calculating a spatial translation vector $(\hat{\omega}_y\Delta\theta, -\hat{\omega}_x\Delta\theta)$;
calculating a scaling factor to convert spatial distances to pixels based on pixel dimensions and fields of view of said one or more 2D projections; and,
calculating said pixel translation vector by scaling said spatial translation vector by said scaling factor.

10. The system of claim 7, wherein said image warper modifies one or more pixels of said at least one display using hardware acceleration.

11. The system of claim 7, wherein said image warper compares said change in pose to a threshold value; and,
generates said rerendering approximation if said change in pose is below said threshold value.

12. An efficient orientation estimation system using magnetic, angular rate, and gravity sensors, comprising:
a magnetometer configured to be attached to one or more body parts of a user, wherein said magnetometer generates magnetic field data;
a rate gyroscope configured to be attached to said one or more body parts of said user, wherein said rate gyroscope generates angular velocity data;
an accelerometer configured to be attached to said one or more body parts of said user, wherein said accelerometer generates acceleration data;
at least one processor comprising a tangible memory medium, coupled to said accelerometer, to said rate gyroscope, and to said magnetometer, and configured to define a sensor orientation quaternion, which rotates a vector in a sensor reference frame into a corresponding vector in an Earth reference frame;
calculate an updated value of said sensor orientation quaternion as
obtain said angular velocity data from said rate gyroscope;
obtain said acceleration data from said accelerometer;
obtain said magnetic field data from said magnetometer;
calculate a gravity prediction in said sensor reference frame;
calculate a horizontal magnetic field prediction in said sensor reference frame;
decompose said magnetic field data into a vertical magnetic component and a horizontal magnetic component;
calculate a gravity error based on said gravity prediction and said acceleration data;
calculate a magnetic field error based on said horizontal magnetic field prediction and said horizontal magnetic component;
calculate an orientation derivative as one half of said sensor orientation quaternion multiplied by a sum of
said angular velocity,
and one or more of
said gravity error multiplied by a gravity error proportional gain,
said magnetic field error multiplied by a magnetic field proportional gain,
a cumulative sum of said gravity error multiplied by a gravity error integral gain,
a cumulative sum of said magnetic field error multiplied by a magnetic field error integral gain,
a derivative of said gravity error multiplied by a gravity error derivative gain, and,
a derivative of said magnetic field error multiplied by a magnetic field error derivative gain; and,
integrate said orientation derivative to form said updated value of said sensor orientation quaternion;
at least one display viewable by said user;
a 3D model of a scene;
a scene renderer coupled to said at least one display, said at least one processor, and said 3D model, wherein said scene renderer
receives said sensor orientation quaternion from said at least one processor;
calculates one or more rendering virtual camera poses, based on said sensor orientation quaternion;
calculates one or more 2D projections of said 3D model, based on said one or more rendering virtual camera poses; and,
transmits said one or more 2D projections to said at least one display; and,
an image warper coupled to said at least one display, said scene renderer, and said at least one processor, wherein said image warper
receives said one or more rendering virtual camera poses from said scene renderer;
receives said sensor orientation quaternion from said at least one processor;
calculates a change in pose between said one or more rendering virtual camera poses and said sensor orientation quaternion;
generates a rerendering approximation of said one or more 2D projections on said at least one display based on said change in pose; and,
modifies one or more pixels of said at least one display based on said rerendering approximation;
wherein said rerendering approximation comprises
approximating said change in pose as a rotation around a unit vector $\hat{\omega}$ comprising $\hat{\omega}_y$ and $\hat{\omega}_x$ by an angle $\Delta\theta$;
calculating a spatial translation vector $(\hat{\omega}_y\Delta\theta, -\hat{\omega}_x\Delta\theta)$;
calculating a scaling factor to convert spatial distances to pixels based on pixel dimensions and fields of view of said one or more 2D projections;
calculating a pixel translation vector by scaling said spatial translation vector by said scaling factor; and,
translating one or more pixels of said one or more 2D projections by said pixel translation vector.

* * * * *